United States Patent
Steyskal et al.

(10) Patent No.: US 11,682,106 B2
(45) Date of Patent: *Jun. 20, 2023

(54) FOVEATED IMAGE RENDERING FOR HEAD-MOUNTED DISPLAY DEVICES

(71) Applicant: Intel Corporation, Santa Clara, CA (US)

(72) Inventors: Aaron Steyskal, Portland, OR (US); Nausheen Ansari, Folsom, CA (US); Nobuyuki Suzuki, Portland, OR (US); Zhiming Zhuang, Sammamish, WA (US); Atsuo Kuwahara, Portland, OR (US); Gary K. Smith, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,973

(22) Filed: Mar. 15, 2021

(65) Prior Publication Data

US 2021/0201446 A1 Jul. 1, 2021

Related U.S. Application Data

(63) Continuation of application No. 15/858,678, filed on Dec. 29, 2017, now Pat. No. 10,949,947.

(51) Int. Cl.
 *G06T 15/00* (2011.01)
 *G06T 3/40* (2006.01)
 (Continued)

(52) U.S. Cl.
 CPC .............. *G06T 3/4038* (2013.01); *G06T 1/20* (2013.01); *G06T 1/60* (2013.01); *G06T 3/0012* (2013.01);
 (Continued)

(58) Field of Classification Search
 CPC .......... G06T 3/4038; G06T 11/60; G06T 1/60; G06T 1/20; G06F 3/013; H04L 67/38
 (Continued)

(56) References Cited

U.S. PATENT DOCUMENTS 3,553,651 A 1/1971 Bird et al.
3,919,534 A 11/1975 Huston et al.
(Continued)

FOREIGN PATENT DOCUMENTS

CA 1236584 5/1988
CN 1078841 11/1993
(Continued)

OTHER PUBLICATIONS

Phillips et al., "Adapted Foveated Single-pixel Imaging with Dynamic Supersampling," Science Advances Magazine, Apr. 21, 2017, 11 pages.

(Continued)

*Primary Examiner* — Phu K Nguyen
(74) *Attorney, Agent, or Firm* — Hanley, Flight & Zimmerman, LLC

(57) ABSTRACT

Examples disclosed herein obtain first image data and the second image data for a foveated image frame to be displayed on a display, the first image data to have a first resolution and the second image data to have a second resolution lower than the first resolution. Disclosed examples also up-sample the second image data based on first metadata to generate up-sampled second image data, the up-sampled second image data to have the first resolution, and combine the first image data and the up-sampled second image data based on second metadata. Disclosed examples further perform, based on third metadata, a combination of at least two different filter operations on an overlap region including a portion of the first image data and a portion of (Continued)

the up-sampled second image data to generate the foveated image frame, the third metadata to specify a width in pixels of the overlap region.

20 Claims, 13 Drawing Sheets

(51) Int. Cl.
  *G06T 11/60* (2006.01)
  *G06T 1/20* (2006.01)
  *G06T 1/60* (2006.01)
  *G06T 3/00* (2006.01)
  *H04L 67/131* (2022.01)
  *G06F 3/01* (2006.01)

(52) U.S. Cl.
  CPC ............ *G06T 11/60* (2013.01); *H04L 67/131* (2022.05); *G06F 3/013* (2013.01)

(58) Field of Classification Search
  USPC ........................................................ 345/418
  See application file for complete search history.

(56) References Cited

U.S. PATENT DOCUMENTS

| | | | |
|---|---|---|---|
| 4,281,312 A | 7/1981 | Knudson | |
| 4,680,730 A | 7/1987 | Omoda et al. | |
| 4,783,841 A | 11/1988 | Crayson | |
| 4,850,027 A | 7/1989 | Kimmel | |
| 5,081,573 A | 1/1992 | Hall et al. | |
| 5,226,171 A | 7/1993 | Hall et al. | |
| 5,262,973 A | 11/1993 | Richardson | |
| 5,434,623 A | 7/1995 | Coleman et al. | |
| 5,517,628 A | 5/1996 | Morrison et al. | |
| 5,586,300 A | 12/1996 | Wilcox et al. | |
| 5,861,873 A | 1/1999 | Kikinis | |
| 5,963,642 A | 10/1999 | Goldstein | |
| 5,968,167 A | 10/1999 | Whittaker et al. | |
| 6,009,511 A | 12/1999 | Lynch et al. | |
| 6,173,389 B1 | 1/2001 | Pechanek et al. | |
| 6,243,806 B1 | 6/2001 | Koumura et al. | |
| 6,252,989 B1 | 6/2001 | Geisler et al. | |
| 6,275,921 B1 | 8/2001 | Iwata et al. | |
| 6,304,605 B1 | 10/2001 | Haikonen et al. | |
| 6,351,335 B1 | 2/2002 | Perlin | |
| 6,366,999 B1 | 4/2002 | Drabenstott et al. | |
| 6,467,036 B1 | 10/2002 | Pechanek et al. | |
| 6,535,644 B1 | 3/2003 | Kurapati | |
| 6,577,316 B2 | 6/2003 | Brethour et al. | |
| 6,591,019 B1 | 7/2003 | Comair et al. | |
| 6,664,955 B1* | 12/2003 | Deering ................ G06T 3/4007 345/428 | |
| 6,760,831 B2 | 7/2004 | Drabenstott et al. | |
| 6,839,728 B2 | 1/2005 | Pitsianis et al. | |
| 6,851,041 B2 | 2/2005 | Pechanek et al. | |
| 6,859,870 B1 | 2/2005 | Kim et al. | |
| 6,948,087 B2 | 9/2005 | Brethour et al. | |
| 6,954,842 B2 | 10/2005 | Drabenstott et al. | |
| 7,010,668 B2 | 3/2006 | Drabenstott et al. | |
| 7,038,687 B2 | 5/2006 | Booth, Jr. et al. | |
| 7,050,068 B1 | 5/2006 | Bastos et al. | |
| 7,124,279 B2 | 10/2006 | Topham | |
| 7,146,487 B2 | 12/2006 | Drabenstott et al. | |
| 7,343,471 B2 | 3/2008 | Topham | |
| 7,366,874 B2 | 4/2008 | Seong et al. | |
| 7,395,297 B2 | 7/2008 | Steele, Jr. | |
| 7,409,530 B2 | 8/2008 | Kim et al. | |
| 7,424,594 B2 | 9/2008 | Pitsianis et al. | |
| 7,474,308 B2 | 1/2009 | Deering | |
| 7,502,918 B1 | 3/2009 | Barowski et al. | |
| 7,884,823 B2 | 2/2011 | Bertolami et al. | |
| 7,894,682 B2 | 2/2011 | Kortum et al. | |
| 8,094,965 B2 | 1/2012 | Shimizu et al. | |
| 8,200,594 B1 | 6/2012 | Bleiweiss | |
| 8,538,886 B1 | 9/2013 | Iu et al. | |
| 8,713,080 B2 | 4/2014 | Moloney | |
| 9,030,583 B2 | 5/2015 | Gove et al. | |
| 9,104,633 B2 | 8/2015 | Moloney | |
| 9,146,747 B2 | 9/2015 | Moloney et al. | |
| 9,196,017 B2 | 11/2015 | Donohoe et al. | |
| 9,223,575 B2 | 12/2015 | Moloney | |
| 9,270,872 B2 | 2/2016 | Donohoe | |
| 9,690,099 B2 | 6/2017 | Bar-Zeev et al. | |
| 9,720,232 B2 | 8/2017 | Hua et al. | |
| 9,727,991 B2 | 8/2017 | Guenter et al. | |
| 9,905,046 B2 | 2/2018 | Janczak et al. | |
| 10,109,039 B1 | 10/2018 | Ray et al. | |
| 10,152,764 B2 | 12/2018 | Surti et al. | |
| 10,319,114 B2 | 6/2019 | Bastani et al. | |
| 10,460,704 B2 | 10/2019 | Barry et al. | |
| 10,514,541 B2* | 12/2019 | Tantos ................ H03M 13/356 | |
| 10,775,886 B2 | 9/2020 | Young et al. | |
| 10,949,947 B2* | 3/2021 | Steyskal ................ G06T 3/4038 | |
| 2002/0158888 A1 | 10/2002 | Kitsutaka | |
| 2003/0005261 A1 | 1/2003 | Sheaffer | |
| 2003/0149822 A1 | 8/2003 | Scott et al. | |
| 2003/0154358 A1 | 8/2003 | Seong et al. | |
| 2004/0101045 A1 | 5/2004 | Yu et al. | |
| 2004/0260410 A1 | 12/2004 | Sakamoto | |
| 2005/0036707 A1 | 2/2005 | Matsuura | |
| 2006/0023429 A1 | 2/2006 | Ribeiro et al. | |
| 2007/0291571 A1 | 12/2007 | Balasundaram | |
| 2008/0007562 A1 | 1/2008 | Stuttard et al. | |
| 2008/0068389 A1 | 3/2008 | Bakalash et al. | |
| 2008/0074515 A1 | 3/2008 | Takane | |
| 2008/0259186 A1 | 10/2008 | Wang et al. | |
| 2009/0080695 A1 | 3/2009 | Yang | |
| 2009/0185748 A1 | 6/2009 | Kortum et al. | |
| 2010/0165144 A1 | 7/2010 | Lee | |
| 2010/0302413 A1 | 12/2010 | Kawashima | |
| 2011/0141326 A1 | 6/2011 | Ishida | |
| 2012/0146891 A1 | 6/2012 | Kalinli | |
| 2012/0216019 A1 | 8/2012 | Bower et al. | |
| 2012/0293677 A1 | 11/2012 | Ostrovsky | |
| 2012/0314946 A1 | 12/2012 | Nomura et al. | |
| 2012/0319928 A1 | 12/2012 | Rhodes | |
| 2013/0116986 A1 | 5/2013 | Zhang et al. | |
| 2014/0063283 A1 | 3/2014 | Chang et al. | |
| 2014/0071309 A1 | 3/2014 | Price et al. | |
| 2014/0184475 A1 | 7/2014 | Tantos et al. | |
| 2014/0247277 A1 | 9/2014 | Guenter et al. | |
| 2015/0277123 A1 | 10/2015 | Chaum et al. | |
| 2017/0169602 A1 | 6/2017 | Blackmon et al. | |
| 2017/0287447 A1 | 10/2017 | Barry et al. | |
| 2019/0043167 A1 | 2/2019 | Steyskal et al. | |

FOREIGN PATENT DOCUMENTS

| | | |
|---|---|---|
| CN | 1326132 | 12/2001 |
| CN | 101086680 | 12/2007 |
| CN | 101147174 | 3/2008 |
| CN | 103249352 | 8/2013 |
| CN | 103930817 | 7/2014 |
| CN | 105340279 | 2/2016 |
| DE | 69228442 | 9/1999 |
| DE | 69519801 | 6/2001 |
| DE | 69709078 | 10/2002 |
| DE | 102007025948 | 1/2008 |
| EP | 240032 | 10/1987 |
| EP | 245027 | 11/1987 |
| EP | 1158401 | 11/2001 |
| EP | 1241892 | 9/2002 |
| ES | 2171919 | 9/2002 |
| FI | 97096 | 6/1996 |
| FR | 2835934 | 8/2003 |
| GB | 710876 | 6/1954 |
| GB | 1488538 | 10/1977 |
| GB | 2311882 | 10/1997 |
| GB | 2348971 | 10/2000 |
| GB | 2362055 | 11/2001 |
| GB | 2362733 | 11/2001 |
| GB | 2366643 | 3/2002 |

(56) References Cited

FOREIGN PATENT DOCUMENTS

| JP | 05-297853 | 11/1993 |
|---|---|---|
| JP | 3042969 | 5/2000 |
| JP | 2002-7211 | 1/2002 |
| JP | 2008-277926 | 11/2008 |
| JP | 2012-524492 | 10/2012 |
| JP | 2014-508311 | 4/2014 |
| JP | 2014-511512 | 5/2014 |
| JP | 2015-222470 | 12/2015 |
| KR | 20130127472 | 11/2013 |
| KR | 20150102026 | 9/2015 |
| WO | 9313628 | 7/1993 |
| WO | 96/08928 | 3/1996 |
| WO | 9738372 | 10/1997 |
| WO | 0022503 | 4/2000 |
| WO | 0034887 | 6/2000 |
| WO | 0045282 | 8/2000 |
| WO | 01/43074 | 6/2001 |
| WO | 0184849 | 11/2001 |
| WO | 2002/051099 | 6/2002 |
| WO | 2005/091109 | 9/2005 |
| WO | 2008010634 | 1/2008 |
| WO | 2008/087195 | 7/2008 |
| WO | 2009101119 | 8/2009 |
| WO | 2010062481 | 6/2010 |
| WO | 2010122010 | 10/2010 |
| WO | 2012082807 | 6/2012 |
| WO | 2013082387 | 6/2013 |
| WO | 2014105654 | 7/2014 |
| WO | 2016094963 | 6/2016 |
| WO | 2016102355 | 6/2016 |
| WO | 2016102365 | 6/2016 |

OTHER PUBLICATIONS

Gonzalez et al., "Data-driven Multiresoulution Camera Using the Foveal Adaptive Pyramid," Sensors, 2016, 27 pages.
Brettle et al., "Stereo Rendering: An Overview," 2005, 7 pages.
Candy et al., "Optical Receptoral, and Retinal Constraints on Foveal and Peripheral Vision in the Human Neonate," 1997, 14 pages.
Liu et al., "Design of a Foveated Imaging System Using a Two-Axis MEMS Mirror," 2006, 8 pages.
Duchowski, "A Breadth-First Survey of Eye-Tracking Applications," 2002, 16 pages.
Stengel et al., "An Affordable Solution for Binocular Eye Tracking and Calibration in Head-Mounted Displays," In Proceedings of the 23rd ACM International Conference on Multimedia, Oct. 2015, pp. 15-24.
International Searching Authority, "International Search Report," issued in connection with International Patent Application No. PCT/IB2017/000283, dated Jun. 26, 2017, 6 pages.
International Searching Authority, "Written Opinion," issued in connection with International Patent Application No. PCT/IB2017/000283, dated Jun. 26, 2017, 9 pages.
Hillaire et al., "Depth-of-Field Blur Effects for First-Person Navigation in Virtual Environments," Proceedings of the 2007 ACM Symposium on Virtual Reality Software and Technology, Nov. 2007, 4 pages.
Alexander, J., "Evolution and use of the VME subsystem bus—VSB," Microprocessors and Microsystems, vol. 10, No. 6, Jul./Aug. 1986, pp. 307-312.
Atoofian, E. and Baniasadi, A., "Improving Energy-Efficiency by Bypassing Trivial Computations," IEEE International Conference on Parallel and Distributed Processing Symposium, 7 pages (Apr. 4-8, 2005).
Atoofian, E. and Baniasadi, A., "Improving Energy-Efficiency in High-Performance Processors by Bypassing Trivial Instructions," IEE-Proc. Comput. Digit. Tech., vol. 153, No. 5, pp. 313-322 (Sep. 6, 2006).
Guenter, et al., "Foveated 3D Graphics and Supplement to Foveated 3D Graphics: User Study Details," Microsoft Corporation, 10 pages (Nov. 20, 2012).

International Preliminary Report on Patentability issued by the European Patent Office for PCT/EP2011/050189 dated Jul. 10, 2012 (5 pages).
International Search Report and Written Opinion issued by the European Patent Office as International Searching Authority for International Application No. PCT/EP2008/053133 dated May 14, 2008 (7 pages).
International Search Report and Written Opinion issued by the European Patent Office as International Searching Authority for International Application No. PCT/EP2008/053134 dated May 21, 2008 (9 pages).
International Search Report and Written Opinion issued by the European Patent Office as International Searching Authority for International Application No. PCT/IB2014/002541 dated Jul. 20, 2015 (14 pages).
International Search Report and Written Opinion issued by the European Patent Office as International Searching Authority for International Application No. PCT/IB2014/003059 dated May 11, 2015 (10 pages).
International Search Report and Written Opinion issued by the U.S. Patent and Trademark Office as International Searching Authority for International Application No. PCT/IB14/03104 dated Jun. 25, 2015 (10 pages).
Islam, M. and Stenstrom, P., "Reduction of Energy Consumption in Processors by Early Detection and Bypassing of Trivial Operations," IEEE Conference on Embedded Computer Systems: Architectures, Modeling and Simulation, Jul. 17-20, 2006, 7 pages.
McCloud, et al., "A Floating Point Unit for the 68040" IEEE International Conference on Computer Desiqn: VLSI in Computers and Processors, Sep. 17-19, 1990, pp. 187-190.
No Author Listed, "ARM Architecture Reference Manual," ARMv7-A and ARMv7-R edition, 1996-1998, 2000, 2004-2012, 2734 pages.
No Author Listed, "Cortex-A8," Revision r3p2, Technical Reference Manual, 2006-2010, 580 pages.
No Author Listed, "Cortex-A9 NEON Media Processing Engine," Revision r3p0, Technical Reference Manual, 2008-2011, 49 pages.
No Author Listed, "FOVE: The World's First Eye Tracking virtual reality headset," 9 pages, retrieved Aug. 24, 2016 from URL: http://www.getfove.com/.
No Author Listed, "i.MX 6Dual/6Quad Applications Processor Reference Manual," Rev. 2, Jun. 2014, 5856 pages.
No Author Listed, "MSC8256 Reference Manual," Six Core Digital Signal Processor, Rev. 0, Jul. 2011, 1272 pages.
No Author Listed, "SC140 DSP Core Reference Manual," Rev. 3, Nov. 2001, 712 pages.
Pooch, U. W. and Neider, A., "A Survey of Indexing Techniques for Sparse Matrices," Computing Surveys vol. 5, No. 2, Jun. 1973, pp. 109-133.
Richardson, S.E., "Exploiting Trivial and Redundant Computation," IEEE, Sun Microsystems Laboratories, Inc., 1993, pp. 220-227.
Rosten, et al., "Machine learning for high-speed corner detection," Department of Engineering, Cambridge University, UK, 2006, 14 pages.
Salomon, D., "Data Compression the Complete Reference," New York, NY Springer, US, pp. 6-10, Jan. 1, 1998, 11 pages.
Williamson, D., "ARM Cortex AS: A High Performance Processor for Low Power Applications," In Unique chips and systems (Eugene John, Juan Rubio, eds.) Boca Raton: CRC Press, 2008, 23 pages.
Yi, J. and Lilja, D., "Improving Processor Performance by Simplifying and Bypassing Trivial Computations", IEEE International Conference on Computer Design: VLSI in Computers and Processors, 10 pages (Sep. 18, 2002).
United States Patent and Trademark Office, "Notice of Allowance," mailed in connection with U.S. Appl. No. 15/088,816, dated Jun. 12, 2019, 7 pages.
United States Patent and Trademark Office, "Non-final Office Action," mailed in connection with U.S. Appl. No. 15/088,816, dated Aug. 29, 2018, 8 pages.
United States Patent and Trademark Office, "Final Office Action," mailed in connection with U.S. Appl. No. 15/088,816, dated Apr. 19, 2018, 10 pages.

(56) References Cited

OTHER PUBLICATIONS

United States Patent and Trademark Office, "Non-final Office Action," mailed in connection with U.S. Appl. No. 15/088,816, dated Aug. 24, 2017, 9 pages.
Wikipedia, "Peripheral Vision," Aug. 18, 2018, 5 pages. Retrieved from http://en.wikipedia.org/w/index.php?title=Peripheral_vision&oldid=855400052.
Patney et al., "Towards Foveated Rendering for Gaze-Tracked Virtual Reality," ACM Transactions on Graphics, vol. 35, No. 6, Article 179, Nov. 2016, 12 pages.
Weier et al., "Foveated Real-Time Ray Tracing for Head-Mounted Display," Computer Graphics Forum, vol. 35, No. 7, 2016, pp. 289-298, 11 pages.
Guenter et al., "Foveated 3D Graphics," ACM SIGGRAPH Asia, Nov. 2012, 10 pages.
Japanese Patent Office, "Office Action," mailed in connection with Japanese Patent Application No. 2018-551349, dated Jun. 9, 2020, 12 pages.
Coltekin, "Foveated for 3D Visualization and Stereo Imaging," TKK Institute of Photogrammetry and Remote Sensing, ESPOO 2006, 174 pages.
Duchowski et al., "Foveated Gaze-contingent Displays for Peripheral LOD Management, 3D Visualization, and Stereo Imaging," ACM Transactions on Multimedia Computing, Communications and Applications, vol. 3, No. 4, Dec. 2007, 18 pages.
Shillcock et al., "Binocular Foveation in Reading," Attention, Perception & Psychophysics, vol. 72, No. 8, 2010, 20 pages.
Coltekin et al., "Stereo Foveation," Jan. 2006, 11 pages.
United States Patent and Trademark Office, "Non-final Office Action," mailed in connection with U.S. Appl. No. 16/584,357, dated May 29, 2020, 14 pages.
Korean Patent Office, "Notification of Reasons for Refusal," mailed in connection with Korean Patent Application No. 10-2018-7031662, dated Oct. 15, 2019, 13 pages.
Japanese Patent Office, "Notice of Reasons for Rejection," mailed in connection with Japanese Patent Application No. 2018-551349, dated Dec. 24, 2019, 10 pages.
Chen et al., "Progressive Transmission and Rendering of Foveated Volume Data," 2006, 9 pages.
Bastani et al., "Foveated Pipeline for AR/VR Head-Mounted Displays," Information Display, 33, Nov. 2017, pp. 14-19 and 35.
Albert et al., "Latency Requirements for Foveated Rendering in Virtual Reality," ACM Transactions on Applied Perception, Sep. 18, 2017.
Bastani, "Strategies for Foveated Compression and Transmission," 2017.
Bastani, "Introducing a New Foveation Pipeline for Virtual/Mixed Reality," Dec. 5, 2017, 7 pages. Retrieved from https://ai.googleblog.com/2017/12/introducing-new-foveation-pipeline-for.html.
Wikipedia, "Peripheral Vision," last updated Aug. 18, 2018, 5 pages. Retrieved from https://en.wikipedia.org/w/index.php?title=Peripheral_vision&oldid=855400052.
United States Patent and Trademark Office, "Notice of Allowance," mailed in connection with U.S. Appl. No. 15/858,678, dated Nov. 6, 2020, 8 pages.
United States Patent and Trademark Office, "Final Office Action," mailed in connection with U.S. Appl. No. 15/858,678, dated Jul. 20, 2020, 13 pages.
United States Patent and Trademark Office, "Non-final Office Action," mailed in connection with U.S. Appl. No. 15/858,678, dated Feb. 14, 2020, 12 pages.
United States Patent and Trademark Office, "Final Office Action," mailed in connection with U.S. Appl. No. 15/858,678, dated Jul. 19, 2019, 12 pages.
United States Patent and Trademark Office, "Non-final Office Action," mailed in connection with U.S. Appl. No. 15/858,678, dated Feb. 14, 2019, 11 pages.
Japanese Patent Office, "Decision to Refuse," mailed in connection with Japanese Patent Application No. 2018-551349, dated Dec. 22, 2020, 7 pages.
European Patent Office, Communication Pursuant to Article 94(3) EPC, mailed in connection with European Patent Application No. 17722498.7, dated Dec. 2, 2020, 7 pages.
United States Patent and Trademark Office, "Non-final Office Action," mailed in connection with U.S. Appl. No. 16/584,357, dated Apr. 26, 2021, 10 pages.
State Intellectual Property Office "First Office Action" issued in related Chinese Application No. 201780027205.0, dated Aug. 14, 2020, 38 pages.
State Intellectual Property Office "Second Office Action" issued in related Chinese Application No. 201780027205.0, dated May 13, 2021, 33 pages.
State Intellectual Property Office "Third Office Action" issued in related Chinese Application No. 201780027205.0, dated Nov. 3, 2021, 34 pages.
European Patent Office "Communication pursuant to Article 94(3) EPC" issued in related European Application No. 17722498.7, dated Nov. 2, 2021, 6 pages.
Korean Intellectual Property Office, "Certificate of Patent" issued in connection with Korean Patent Application No. 10-2018-7031662, dated Jul. 27, 2020, 2 pages.
Korean Intellectual Property Office "Notice of Allowance" issued in related Korean Application No. 10-2018-7031662, dated Apr. 27, 2020, 3 pages.
United States Patent and Trademark Office "Final Office Action" issued in related U.S. Appl. No. 16/584,357, dated Oct. 22, 2021, 15 pages.
United States Patent and Trademark Office "Non-Final Office Action" issued in related U.S. Appl. No. 16/584,357, dated Nov. 10, 2020, 18 pages.
Chen, "Progressive transmission and rendering of foveated volume data", 2005, 58 pages.
StackOverFlow, "Multiple logical buffers in one real frame buffer", published Mar. 2012, 3 pages.

* cited by examiner

Pixel Data Transfer over
MIPI DSI

Pixel Data Transfer over
TAD

1200 →

| | Display Host Controller throughput (MB/sec) | Display interface throughput (Gbit/sec) |
|---|---|---|
| Disclosed Foveated Rendering — Region A | 172.8 | 1.7 |
| Disclosed Foveated Rendering — Region B | 691.2 | 6.7 |
| Disclosed Foveated Rendering — Region C | 1555.2 | 15.2 |
| Disclosed Foveated Rendering — Total | 2419.2 | 23.6 |
| Prior art | 24883.2 | 242.6 |

FIG. 12

FOVEATED IMAGE RENDERING FOR HEAD-MOUNTED DISPLAY DEVICES

FIELD OF THE DISCLOSURE

This patent arises from a continuation of U.S. patent application Ser. No. 15/858,678, which is titled, "FOVEATED IMAGE RENDERING FOR HEAD-MOUNTED DISPLAY DEVICES," and which was filed on Dec. 29, 2017. Priority to U.S. patent application Ser. No. 15/858,678 is claimed. U.S. patent application Ser. No. 15/858,678 is hereby incorporated herein by reference in its entirety.

FIELD OF THE DISCLOSURE

This disclosure relates generally to image rendering and, more particularly, to foveated image rendering for head-mounted display devices.

BACKGROUND

Foveated image rendering is an image rendering technique in which image resolution varies in an image frame based on one or more regions of focus. In some examples, foveated image rendering involves rendering full resolution (e.g., high-resolution) image data in a region of focus of an image frame, and rendering lower resolution image data outside the region of focus. As such, foveated image rendering mimics the behavior of human peripheral vision, in which visual acuity reduces outside a human's field of focus.

BRIEF DESCRIPTION OF THE DRAWINGS

FIG. 12 illustrates example performance results that can be achieved with foveated image rendering implemented in accordance with the teachings of this disclosure

The figures are not to scale. In general, the same reference numbers will be used throughout the drawing(s) and accompanying written description to refer to the same or like parts, elements, etc.

DETAILED DESCRIPTION

Figure 1:
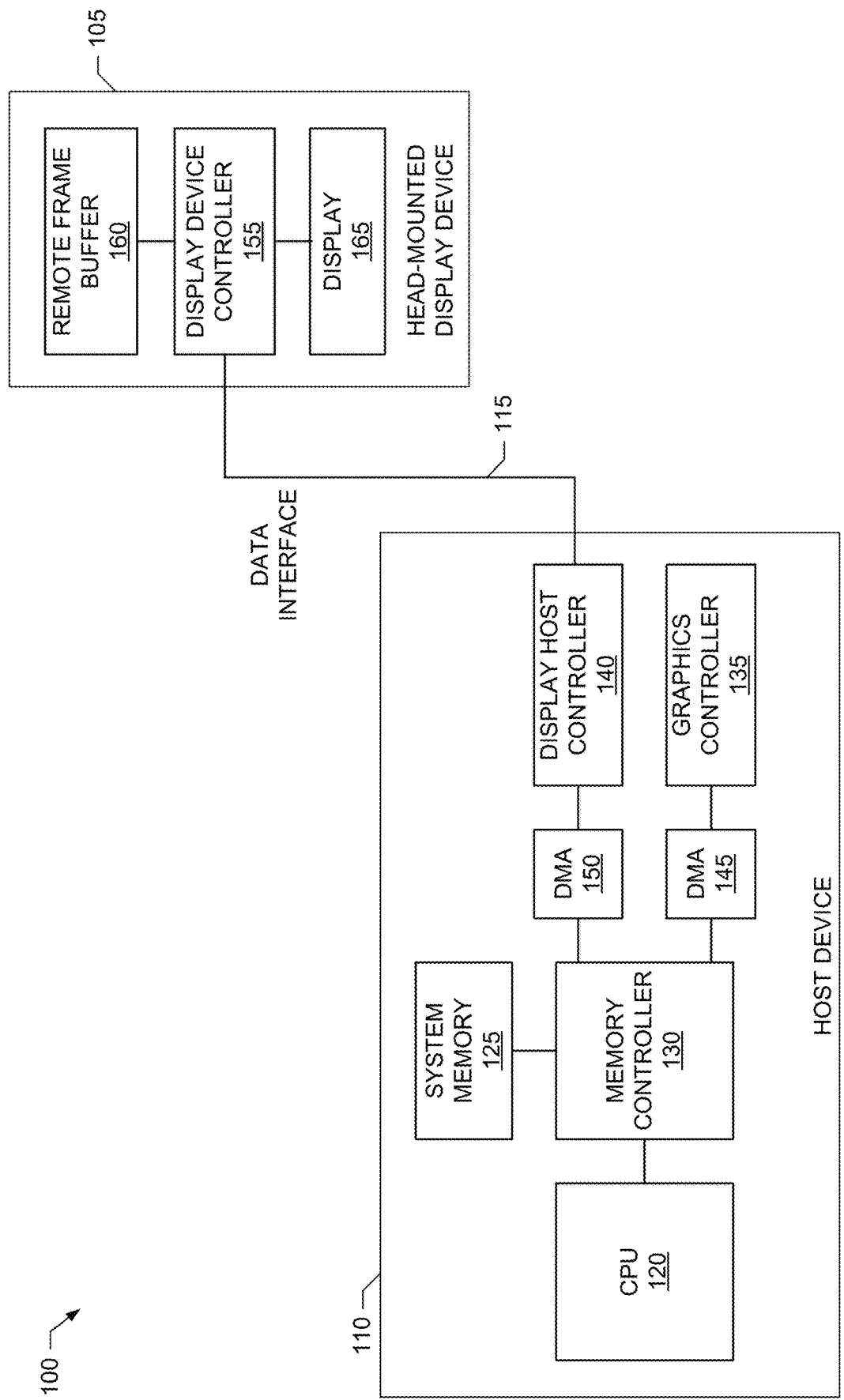
FIG. 1 is a block diagram of an example system including an example host device and an example head-mounted display device implementing foveated image rendering in accordance with teachings of this disclosure.

Example methods, apparatus, systems and articles of manufacture (e.g., non-transitory physical storage media) to implement foveated image rendering for head-mounted display devices are disclosed herein. Example head-mounted display devices disclosed herein include a frame buffer to store first image data and second image data for an image frame. The first image data (e.g., high-resolution image data) has a first resolution (e.g., a high-resolution) and the second image data (e.g., downsized, low-resolution image data) has a second resolution (e.g., a low-resolution) lower than the first resolution. The first image data and the second image data are obtained (e.g., received) from a host device via a data interface. For example, the first resolution of the first image data may correspond to a full resolution of a display of the head-mounted display device. Disclosed example head-mounted display devices also include a device controller to up-sample the second image data based on first metadata from the host device to generate up-sampled second image data having the first resolution. In disclosed examples, the device controller also combines the first image data and the up-sampled second image data based on second metadata from the host device to render a foveated image frame on a display of the head-mounted display device.

In some disclosed examples, the first metadata used by the device controller to up-sample the second image data and the second metadata used by the device controller to combine the first image data and the up-sampled second image data are included in a metadata packet from the host device, with the first and second metadata being obtained before the first image data and the second image data. In some disclosed examples, the first metadata, the second metadata and the second image data are included in a data packet from the host device.

In some disclosed examples, the first metadata, which is used by the device controller to up-sample the second image data, is to specify the second resolution of the second image data (e.g., the low-resolution image data) or a down-sizing ratio corresponding to the second resolution. In some disclosed examples, the second metadata, which is used by the device controller to combine the first image data and the up-sampled second image data, is to specify a position of the first image data (e.g., the high-resolution image data) in the foveated image frame.

In some such disclosed example head-mounted display devices, the device controller is further to up-sample third image data (e.g., other downsized, low-resolution image data) having a third resolution from the host device to generate up-sampled third image data having the first resolution, where the third resolution is lower than the first resolution and the second resolution. In some such examples, the device controller is to up-sample the third image data based on third metadata from the host device. For example, the third metadata may specify the third resolution of the second image data or a down-sizing ratio corresponding to the third resolution. In some such head-mounted display devices, the device controller is also to combine the first image data, the up-sampled second image data and the up-sampled third image data based on the second metadata and fourth metadata from the host device to render the foveated image frame on the display. For example, the fourth metadata may specify a position of the second image data in the foveated image frame. In some such examples, the first image data is to correspond to a first region of the foveated image frame, the second image data is to correspond to a second region of the foveated image frame, the third image data is to correspond to a third region of the foveated image frame, the second region is included in the third region, and the first region is included in the second region.

In some disclosed examples, the first image data is to correspond to a first region of the foveated image frame, the second image data is to correspond to a second region of the foveated image frame, and the first region is included in the second region. In some such disclosed example head-mounted display devices, the device controller is further to access third metadata from the host device, where the third metadata is to specify an overlapping region of the foveated image frame, where the overlapping region includes a portion of the first region and a portion of the second region. In some such disclosed examples, the device controller is also to filter the first image data associated with the portion of the first region included in the overlapping region and the up-sampled second image data associated with the portion of the second region included in the overlapping region to generate filtered image data to render the overlapping region of the foveated image frame.

Example systems to implement foveated image rendering as disclosed herein include a data interface, a host device and a head-mounted display device in communication with the host device via the data interface. In some disclosed example systems, the host device is to generate downsized image data associated with a low-resolution region of a foveated image frame. For example, the downsized image data may have a lower resolution than a full resolution supported by the head-mounted display device. In some disclosed example systems, the head-mounted display device is to receive the downsized image data associated with the low-resolution region from the host device, and up-sample, based on first metadata received from the host device, the downsized image data associated with the low-resolution region to generate up-sampled image data associated with the low-resolution region. In some disclosed example systems, the head-mounted display device is further to combine, based on second metadata from the host device, the up-sampled image data associated with the low-resolution region with image data associated with a high-resolution region of the foveated image frame to render the foveated image frame.

In some disclosed example systems, the head-mounted display device is to obtain the image data associated with the high-resolution region from the host device. For example, the head-mounted display device may obtain the image data associated with the high-resolution region from the host device before the downsized image data associated with the low-resolution region is obtained from the host device.

In some disclosed example systems, the head-mounted display device is to obtain a metadata packet including the first metadata (which is used to up-sample the downsized image data associated with the low-resolution region) and the second metadata (which is used to combine the up-sampled image data associated with the low-resolution region with image data associated with a high-resolution region) from the host device, with the metadata packet being obtained before the downsized image data associated with the low-resolution region is obtained from the host device. In some disclosed example systems, the head-mounted display device is to obtain the first metadata, the second metadata, and the downsized image data in a data packet from the host device In some disclosed example systems, the first metadata, which is used to up-sample the downsized image data associated with the low-resolution region, is to specify a down-sizing ratio associated with the low-resolution region. In some disclosed example systems, the second metadata, which is used to combine the up-sampled image data associated with the low-resolution region with image data associated with a high-resolution region, is to specify a position of the high-resolution region in the foveated image frame.

In some such disclosed example systems, the low-resolution region of the foveated image frame is a first low-resolution region, the down-sizing ratio is a first down-sizing ratio, and the host device is further to generate downsized image data associated with a second low-resolution region of the foveated image frame. For example, the down-sized image data associated with a second low-resolution region may have a lower resolution than a full resolution supported by the head-mounted display device. In some such disclosed example systems, the head-mounted display device is further to receive the downsized image data associated with the second low-resolution region from the host device, and up-sample, based on third metadata received from the host device, the downsized image data associated with the second low-resolution region to generate up-sampled image data associated with the second low-resolution region. For example, the third metadata may specify a second down-sizing ratio used to generate the downsized image data associated with the second low-resolution region. In some such disclosed example systems, the head-mounted display device is also to combine, based on the second metadata and fourth metadata received from the host device, the up-sampled image data associated with the second low-resolution region, the up-sampled image data associated with the first low-resolution region and the image data associated with the high-resolution region to render the foveated image frame. For example, the fourth metadata may specify a position of the first low-resolution region in the foveated image frame.

These and other example methods, apparatus, systems and articles of manufacture (e.g., non-transitory physical storage media) to implement foveated image rendering for head-mounted display devices are disclosed in further detail below.

As noted above, foveated image rendering is an image rendering technique in which image resolution varies in an image frame based on one or more regions of focus to mimic the behavior of human peripheral vision, in which visual acuity reduces outside a human's field of focus. For example, foveated image rendering can include rendering full resolution (e.g., high-resolution) image data in a region of focus of an image frame, and low-resolution image data outside the region of focus. In some examples, the high-resolution image data has an image resolution corresponding to the full display resolution supported by the target display device (e.g., such as 2000×2000 pixels or some other image resolution), whereas the low-resolution image data has an image resolution lower than the full display resolution supported by the target display device (e.g., such as a ratio of 1/4 of the full resolution, a ratio of 1/16 of full resolution, etc., other some other image resolution). The rendering of the lower resolution image data typically involves up-sampling (also referred to as over-sampling, up-converting, etc.) the lower resolution data to a sampling rate corresponding to the full resolution data such that the imaging data can be combined to render the entire image frame at full resolution.

It would be desirable to employ foveated image rendering in head-mounted display devices, such as virtual reality (VR) headsets and augmented reality (AR) headsets, which include eye-trackers. However, existing head-mounted display devices do not support the rendering of variable resolution images. Furthermore, the data interfaces used to interconnect existing head-mounted display devices with host devices (e.g., such as computers, gaming consoles, mobile phones, etc.) may not have sufficient bandwidth to transfer entire image frames at full-resolution (e.g., high-resolution) if the up-sampling of the low-resolution image data of the foveated image frames is performed at the host device. This can be especially problematic for head-mounted display devices that utilize high refresh rates and image resolutions to achieve high quality and/or realistic video presentations.

In contrast with such prior head-mounted display devices and associated systems, example head-mounted display devices and associated systems disclosed herein implement foveated image rendering to display multiresolution, foveated image frames on the display of the head-mounted display device. Furthermore, example head-mounted display devices and associated systems transfer the low-resolution image data of the foveated image frame from the host device to the head-mounted display device without first being up-sampled at the host device, thereby reducing the bandwidth requirements of the data interfaces employed to interconnect the head-mounted display device with the host device (e.g., computer, gaming console, mobile phone, etc.) providing the image data to be rendered. As disclosed in further detail below, example head-mounted display devices and associated systems disclosed herein include up-sampling and image combining capabilities in the head-mounted display device, along with communication protocols to transmit the multi-resolution image data making up a foveated image frame from the host device to the head-mounted display devices, to implement foveated image rendering for the head-mounted display device.

Turning to the figures, a block diagram of an example head-mounted display system 100 implementing foveated image rendering for an example head-mounted display device 105 constructed in accordance with teachings of this disclosure is illustrated in FIG. 1. The system 100 of FIG. 1 includes an example host device 110 to provide foveated image data for rendering at the head-mounted display device 105. The host device 110 can correspond to any type of device capable of providing image data, such as, but not limited to, a server, a computer, a game console, a mobile phone (e.g., a smartphone), a tablet device, an Internet appliance, a drone, an autonomous vehicle, etc. In some examples, the host device 110 is implemented by the example processor platform 1600 of FIG. 16, which is described in further detail below. The head-mounted display device 105 can correspond to, for example, a VR headset, an AR headset, smart glasses, a wearable display device, etc. In some examples, the head-mounted display device 105 is implemented by the example processor platform 1700 of FIG. 17, which is described in further detail below.

In the illustrated example, the head-mounted display device 105 is interconnected with, or otherwise in communication with, the host device 110 via an example data interface 115. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. The data interface 115 of the illustrated example can be implemented by any number and/or type(s) of data interfaces, such as, but not limited to, a wired interface (e.g., such as a DisplayPort (DP) interface, an embedded DP (eDP) interface, a high-definition multimedia interface (HDMI), a mobile industry processor interface (MIPI) display serial interface (DSI), a universal serial bus (USB) interface, an Ethernet interface, a serial data interface, etc.), a wireless interface (e.g., such as a Bluetooth® interface, an infrared (IR) interface, an ultra-wideband (UW) interface, a near field communication (NFC) interface, etc.), a communication network (e.g., such as a wireless local area network (WLAN), a cellular communication network, the Internet, etc.), etc. In some examples, the data interface 115 is implemented by the example interface circuit 1620 of FIG. 16 and/or the example interface circuit 1720 of FIG. 17, which are described in further detail below.

In the illustrated example of FIG. 1, the host device 110 includes an example central processing unit 120, example system memory 125 and an example memory controller 130 to provide access to the system memory 125. To support graphics processing and, in particular, foveated image rendering as disclosed herein, the host device 110 of the illustrated example also includes an example graphics controller 135 and an example display host controller 140. Furthermore, in the example of FIG. 1, the graphics controller 135 and the display host controller 140 are interconnected with, or otherwise in communication with, the memory controller 130 and the system memory 125 via respective direct memory access (DMA) hardware controllers 145 and 150 (which are also referred to as DMA accelerators 145-150, or DMAs 145-150). In the example host device 110 of FIG. 1, the graphics controller 135 generates or otherwise obtains foveated image data to be rendered at the head-mounted display device 105 and stores the foveated image data in the system memory 125. In the example host device 110 of FIG. 1, the display host controller 140 retrieves the foveated image data from the system memory 125 and transmits the foveated image data, and metadata specifying characteristics of the foveated image frame to be rendered, to the head-mounted display device 105.

To support graphics processing and, in particular, foveated image rendering as disclosed herein, the head-mounted display device 105 of the illustrated example includes an example display device controller 155, an example remote frame buffer 160 and an example display 165. In the example head-mounted display device 105 of FIG. 1, the display device controller 155 receives the foveated image data from the host device 110 and stores the foveated image data in the remote frame buffer 160. As disclosed in further detail below, the display device controller 155 also uses the metadata received from the host device 110, which specifies characteristics of the foveated image frame to be rendered, to process the received image data to render the foveated image frame on the display 165.

Figure 2:
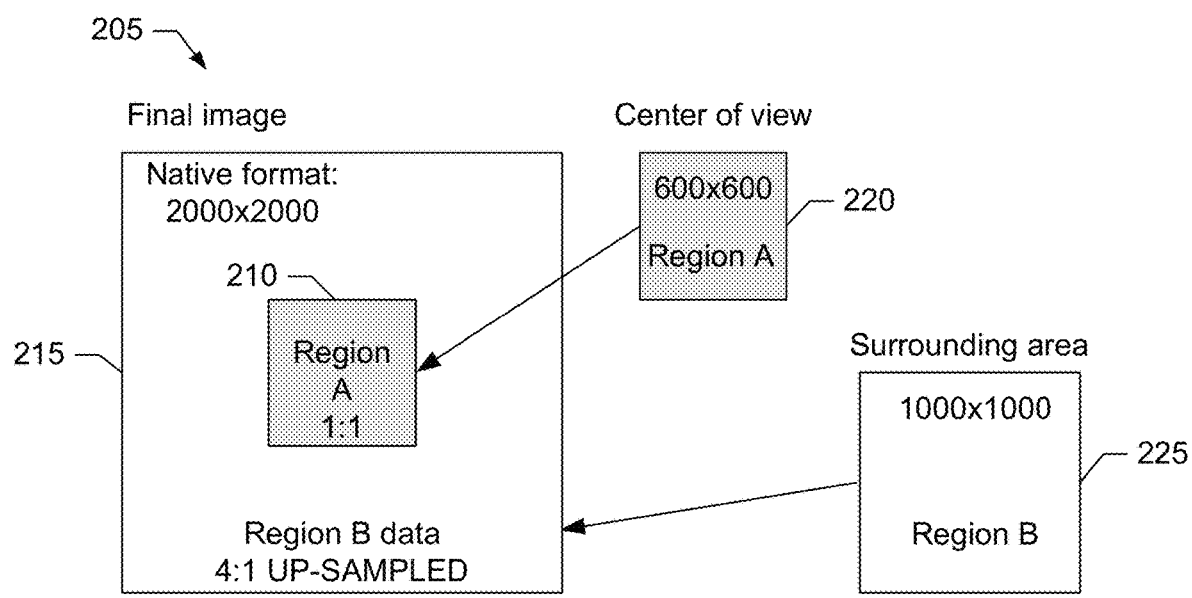
FIG. 2 illustrates an example of foveated image rendering.

An example of foveated image rendering capable of being performed by the example head-mounted display device 105 and the example host device 110 is illustrated in FIG. 2. In the example of FIG. 2, an example foveated image frame 205 to be rendered by the head-mounted display device 105 includes an example high-resolution region 210 and an example low-resolution region 215. For example, the high-resolution region 210 may correspond to a region of focus of the foveated image frame 205, such as a rectangular region of focus, a circular or elliptical region of focus, etc. The low-resolution region 215 may correspond to a peripheral region of the foveated image frame 205, such as a rectangular region, an annular region, etc., around the high-resolution region 210 corresponding to the region of focus. In the illustrated example of FIG. 2, the high-resolution region 210 is rendered from image data (e.g., pixel data) corresponding to a first example image 220, and the low-resolution region 215 is rendered from image data (e.g., pixel data) corresponding to a second example image 225.

In the illustrated example, the full resolution of the foveated image frame 205 to be rendered on the display 165 is 2000×2000 pixels, which corresponds to the target size of the low-resolution region 215. However, the low-resolution region 215 of the frame 205 can have lower resolution than the full resolution associated with the high-resolution region 210 of the frame 205. Thus, to reduce the amount of image data (e.g., pixel data) to be transmitted over the data interface 115, the graphics controller 135 of the host device 110 generates (e.g., renders) or otherwise obtains downsized image data corresponding to the second example image 225, where the downsized image data has a smaller size (e.g., number of pixels) than the target size of the low-resolution region 215 to be displayed on the target display 165, which results in the downsized image data of the low-resolution region 215 having a lower resolution than the high-resolution region 210 when the downsized image data is displayed on the target display 165. In the illustrated example, the graphics controller 135 generates the downsized image data corresponding to the second example image 225 to have a down-sizing ratio of 4:1, which yields a resulting image size and resolution of 1000×1000 pixels, as shown. Using downsized image data for the low-resolution image region(s) of the foveated image frame 205 results in a substantial reduction (e.g., by a factor of 4 in this example) in the amount of image data to be transmitted from the host device 110 to the head-mounted display device 105 via the data interface 115.

In the illustrated example of FIG. 2, the display host controller 140 of the host device 110 transmits the image data corresponding to the first example image 220 and the downsized image data corresponding to the second example image 225 via the data interface 115 to the head-mounted display device 105 for rendering. The display host controller 140 of the host device 110 also transmits metadata via the data interface 115 to the head-mounted display device 105 specifying characteristics of the foveated image frame 205 to be rendered by the head-mounted display device 105. For example, such metadata may specify a position of the image data corresponding to the first example image 220 in the foveated image frame 205 (e.g., or, equivalently, a position of the high-resolution region 210 in the foveated image frame 205). The metadata may also specify the resolution and/or down-sizing ratio associated with the image data of the second example image 225, as well as any other characteristics of the foveated image frame 205 to be rendered. The head-mounted display device 105 uses the received metadata to process the image data of the first example image 220 and the downsized image data of the second example image 225 to render the foveated image frame 205 on the display 165.

For example, the display device controller 155 of the head-mounted display device 105 uses the received metadata to determine that received image data of the second example image 225 has been downsized by a ratio of 4:1 to have a lower downsized resolution relative to the full resolution of the foveated image frame 205. Accordingly, the display device controller 155 of the head-mounted display device 105 up-samples the received image data of the second example image 225 by a factor of 4 to generate up-sampled image data having a resolution corresponding to the full resolution of the image (e.g., 2000×2000 pixels). (As used herein, the terms up-sample, over-sample and up-convert refer to equivalent operations, unless otherwise specified.) The display device controller 155 of the head-mounted display device 105 further uses the received metadata to determine the position of the high-resolution region 210 in the foveated image frame 205. With that position information, the display device controller 155 of the head-mounted display device 105 combines the image data of the first example image 220 and the up-sampled image data of the second example image 225 to render the foveated image frame 205 on the display 165. For example, if the image data of the first example image 220 has the same resolution as the full resolution of the foveated image frame 205 (albeit with a smaller image size), the display device controller 155 can render the up-sampled image data of the second example image 225 when rendering the low-resolution region 215 of the foveated image frame 205, and use 1-to-1 mask blitting to render the image data of the first example image 220 in the high-resolution region 210 of the foveated image frame 205.

Figure 3:
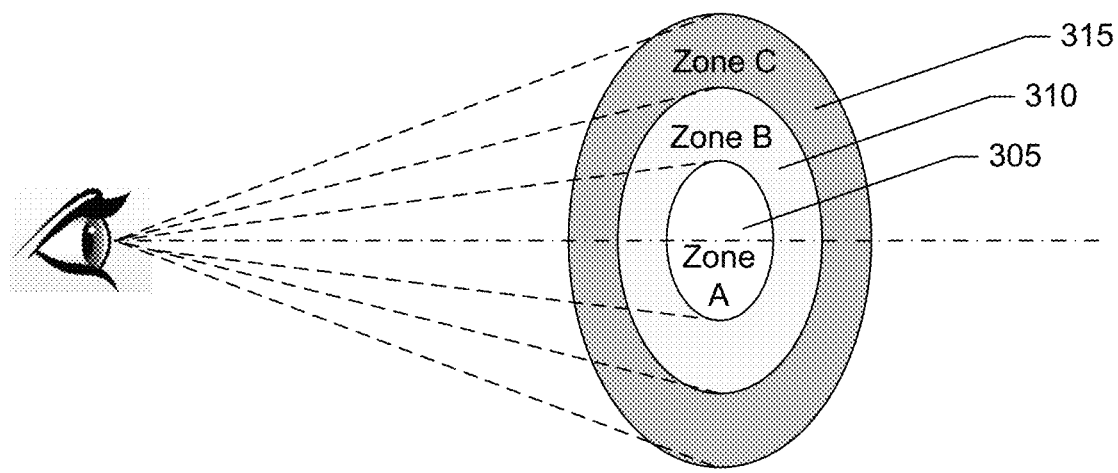
FIG. 3 illustrates different example acuity zones associated with human vision.
Figure 4:
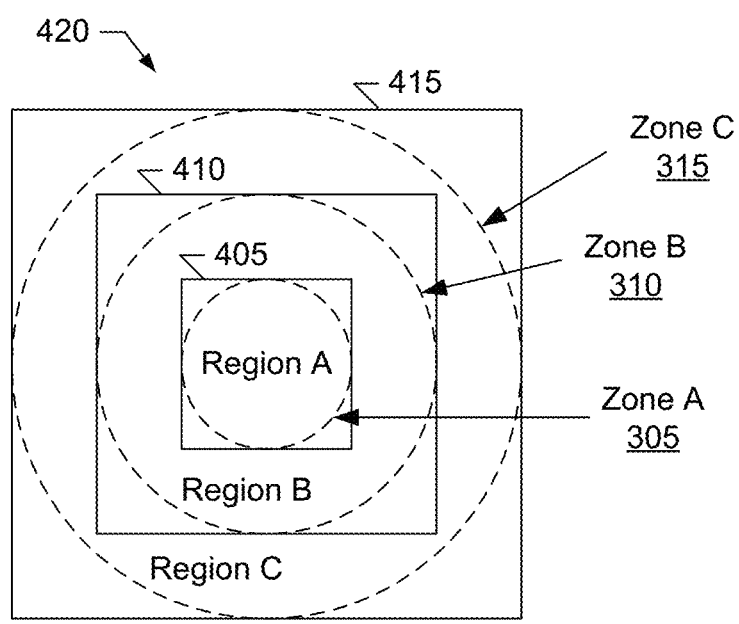
FIG. 4 illustrates an example mapping of human vision acuity zones to regions of a foveated image.

As noted above, foveated image rendering can be used to mimic the behavior of human peripheral vision, in which visual acuity reduces outside a human's field of focus. An example of mapping acuity zones associated with human vision to different regions of a foveated image frame is shown in FIGS. 3-4. In particular, FIG. 3 illustrates example acuity zones 305-315 associated with human vision. For example, the acuity zone 305 corresponds to a human's field of focus, which is also referred to as the viewing focal point, center of gaze, fixation point, etc., and typically corresponds to a human's best visual acuity. In the illustrated example of FIG. 3, the acuity zone 310 corresponds to a zone of near peripheral vision lying outside the field of focus. Typically, visual acuity in the zone of near peripheral vision (e.g., zone 310) declines relative to visual acuity in the field of focus (e.g., zone 305). In the illustrated example of FIG. 3, the acuity zone 315 corresponds to a zone of far peripheral vision lying outside the zone of near peripheral vision. Typically, visual acuity in the zone of far peripheral vision (e.g., zone 315) declines relative to visual acuity zone of near peripheral vision (e.g., zone 310).

FIG. 4 illustrates example mapping of the example acuity zones 305-315 to corresponding example regions 405-415 of an example foveated image frame 420. For example, region 405 corresponds to acuity zone 305, which represents the field of focus in the image frame 420. Accordingly, image data in region 405 of foveated image frame 420 has the highest resolution among the regions 405-415. For example, image data in region 405 may have the full resolution supported by the display 165.

In the illustrated example of FIG. 4, region 410 corresponds to acuity zone 310, which represents the zone of near peripheral vision in the image frame 420. Accordingly, image data in region 410 of foveated image frame 420 may have lower resolution than the image data in region 405. In the illustrated example of FIG. 4, region 415 corresponds to acuity zone 315, which represents the zone of far peripheral vision in the image frame 420. Accordingly, image data in region 415 of foveated image frame 420 may have lower resolution than the image data in regions 405 and/or 410. For example, the image data in region 415 of foveated image frame 420 may have the lowest resolution among the regions 405-415.

Figure 5:
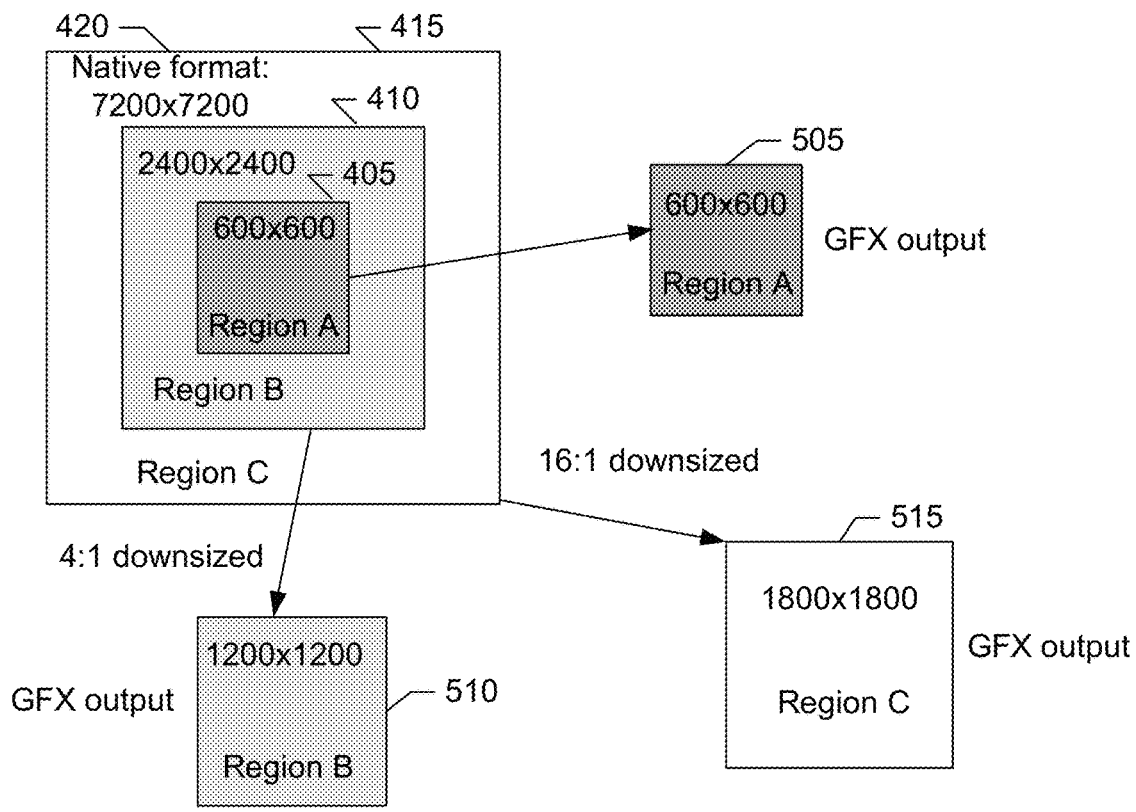
FIG. 5 illustrates example image downsizing operations performed by the example host device of FIG. 1 to implement foveated image rendering in accordance with teachings of this disclosure.
Figure 6:
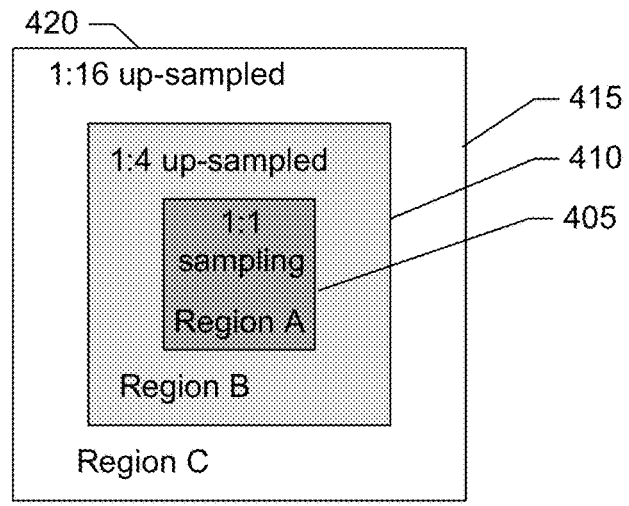
FIG. 6 illustrates example up-sampling operations performed by the example head-mounted display device of FIG. 1 to implement foveated image rendering in accordance with teachings of this disclosure.

An example of foveated image rendering performed by the example head-mounted display device 105 and the example host device 110 of FIG. 1 to render the example foveated image frame 420 of FIG. 4 is illustrated in FIGS. 5-6. In particular, FIG. 5 illustrates example processing performed by the host device 110 to prepare image data to be used to render the different regions 405-415 of the foveated image frame 420. FIG. 6 illustrates example operations processing performed by the head-mounted display device 105 to render the foveated image frame 420 using the foveated image data received from the host device 110.

In the illustrated foveated image rendering example of FIGS. 5-6, the first (e.g., highest resolution) region 405 of the foveated image frame 420 is to be rendered from image data (e.g., pixel data) corresponding to a first example image 505. The second (e.g., lower, intermediate resolution) region 410 of the foveated image frame 420 is to be rendered from image data (e.g., pixel data) corresponding to a second example image 510. The third (e.g., lowest resolution) region 415 of the foveated image frame 420 is to be rendered from image data (e.g., pixel data) corresponding to a third example image 515. Also, in the illustrated example, the full resolution of foveated image frame 420 to be rendered on the display 165 of the head-mounted display device 105 is 7200×7200 pixels, which corresponds to the size of the third (e.g., lowest resolution) region 415. Furthermore, the size of the second (e.g., intermediate resolution) region 410 is 2400×2400 pixels. However, the third (e.g., lowest resolution) region 415, as well as the second (e.g., intermediate resolution) region 410, can have lower image resolution(s) than the full resolution associated with the first (e.g., highest resolution) region 405. Thus, to reduce the amount of image data (e.g., pixel data) to be transmitted over the data interface 115, the graphics controller 135 of the host device 110 generates (e.g., renders) or otherwise obtains downsized image data corresponding to the third example image 515, which has a smaller size (e.g., number of pixels) than the target size of the third region 415 to be displayed on the target display 165, which results in the downsized data of the third region 315 having a lower resolution than the high-resolution region 405 when the downsized image data is displayed on the target display 165. For example, the graphics controller 135 generates the downsized image data corresponding to the third example image 515 to have a down-sizing ratio of 16:1, which yields a resulting image size and resolution of 1800×1800 pixels, as shown. In the illustrated example, the graphics controller 135 of the host device 110 also generates downsized image data corresponding to the second example image 510, which has a smaller size (e.g., number of pixels) than the target size of the second region 410 to be displayed on the target display 165, which results in the downsized image data of the second region 315 having a lower resolution than the high-resolution region 405 when the downsized image data is displayed on the target display 165. For example, the graphics controller 135 generates the downsized image data corresponding to the second example image 510 to have a down-sizing ratio of 4:1, which yields a resulting image size and resolution of 1200×1200 pixels, as shown. Using such downsized image data for the low-resolution image region(s) of the foveated image frame 420 results in a substantial reduction (e.g., by factors of 16 and 4 in this example) in the amount of image data to be transmitted from the host device 110 to the head-mounted display device 105 via the data interface 115. (In the illustrated example, the image data corresponding to the first example image 505 is not downsized because this image data is used to render the highest resolution region 405 of the foveated image frame 420.)

In the illustrated example of FIGS. 5-6, the display host controller 140 of the host device 110 transmits the image data corresponding to the first example image 505, the downsized image data corresponding to the second example image 510 and the downsized image data corresponding to the third example image 515 via the data interface 115 to the head-mounted display device 105 for rendering. The display host controller 140 of the host device 110 also transmits metadata via the data interface 115 to the head-mounted display device 105 specifying characteristics of the foveated image frame 420 to be rendered by the head-mounted display device 105. For example, such metadata may specify a position of the image data corresponding to the first example image 505 in the foveated image frame 420 (e.g., or, equivalently, a position of the first region 405 in the foveated image frame 420), a position of the image data corresponding to the second example image 510 in the foveated image frame 420 (e.g., or, equivalently, a position of the second region 410 in the foveated image frame 420), the resolution and/or down-sizing ratio associated with the image data of the second example image 510, the resolution and/or down-sizing ratio associated with the image data of the third example image 515, etc. The head-mounted display device 105 110 uses the received metadata to process the image data of the first example image 505, the downsized image data of the second example image 510 and the downsized image data of the third example image 515 to render the foveated image frame 420 on the display 165.

For example, with reference to FIG. 6, when the display device controller 155 of the head-mounted display device 105 begins receiving the image data of the third example image 515 to be rendered in the third region 415 of the foveated image frame 420, the display device controller 155 will start to refresh the display 165 line by line, such as from top to bottom of the display. The display device controller 155 of the head-mounted display device 105 uses the received metadata to determine that received image data of the third example image 515 has been downsized by a ratio of 16:1 relative to the full size of the third region 415 in the foveated image frame 420. Accordingly, when rendering the region 415 of the foveated image frame 420, the display device controller 155 of the head-mounted display device 105 up-samples the received, downsized image data of the third example image 515 by a factor of 16 to generate up-sampled image data corresponding to the full size and resolution of the rendered image 420 (e.g., 7200×7200 pixels).

In the illustrated example of FIG. 5, the display device controller 155 of the head-mounted display device 105 also uses the received metadata to determine the position of the second region 410 and the first region 405 in the foveated image frame 205. With that position information, the display device controller 155 of the head-mounted display device 105 combines (e.g., via interleaving, Witting, etc.) the image data of the first example image 505 and the image data of the second example image 510 with the up-sampled image data of the third example image 515 to render the foveated image frame 415 on the display 165. Furthermore, the display device controller 155 of the head-mounted display device 105 uses the received metadata to determine that received image data of the second example image 510 has been downsized by a ratio of 4:1 relative to the full size of the second region 410 in the foveated image frame 420. Accordingly, when rendering the region 410 of the foveated image frame 420 (e.g., as determined by the position information included in the received metadata), the display device controller 155 of the head-mounted display device 105 up-samples the received, downsized image data of the second example image 510 by a factor of 4 to generate up-sampled image data corresponding to the full size and resolution of the region 410 in the rendered image 420 (e.g., 2400×2400 pixels). In the illustrated example, the image data of the first example image 505 has the same resolution as the full resolution of the foveated image frame 420 (albeit with a smaller image size). Thus, when rendering the region 405 of the foveated image frame 420 (e.g., as determined by the position information included in the received metadata), the display device controller 155 of the head-mounted display device 105 renders the image data of the first example image 505 without any up-sampling (e.g., at a 1-to-1 mapping ratio).

Because of the resolution/down-sizing ratio(s) and position information included in the foveated image metadata provided by the host device 110, foveated image frames rendered by the head-mounted display device 105 are not limited to down-sizing ratios/up-sampling rates of 4:1 and 16:1, or center-aligned regions 405-415, as shown in the example of FIGS. 5-6. Rather, the resolution/down-sizing ratio(s) and position information included in the foveated image metadata provided by the host device 110 also allows the head-mounted display device 105 to render foveated image frames having off-center regions 405-415 with any resolution/down-sizing.

Figure 7:
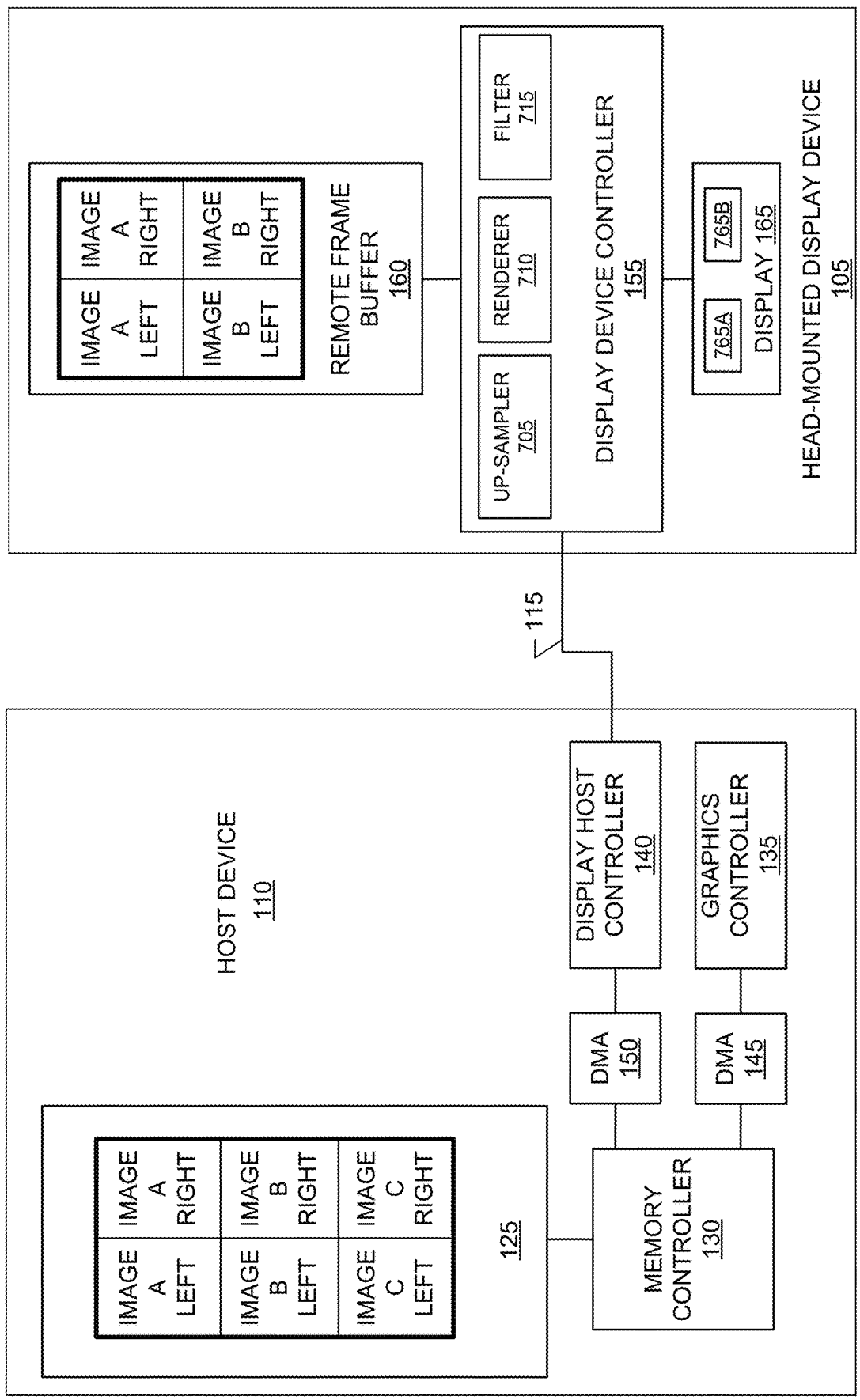
FIG. 7 is a block diagram illustrating example implementations of the host device and the head-mounted display device of FIG. 1.

FIG. 7 illustrates further example implementations of the example head-mounted display device 105 and the example host device 110 of FIG. 1. In the illustrated example of FIG. 7, the host device includes the example system memory 125, the example memory controller 130, the example graphics controller 135, the example display host controller 140 and the example DMA controllers 145-150 described. (Although the host device 110 also includes the example CPU 120, the CPU 120 is not shown in the example of FIG. 7 to enhance clarity of the illustration). In the illustrated example of FIG. 7, the head-mounted display device 105 includes the example display device controller 155, the example remote frame buffer 160 and the example display 165 described above.

In the illustrated example of FIG. 7, the display 165 of the head-mounted display device 105 includes two (2) example targets screens 765A and 765B. The target screen 765A corresponds to the left eye, and the target screen 765B corresponds to the right eye. Also, the example head-mounted display device 105 and the example host device 110 of FIG. 7 support rendering of foveated image frames, such as the foveated image frame 420, having three (3) regions, such as the regions 405-415, on each of the left and right screens 765A-B of the display 165. In the example of FIG. 7, regions into which the foveated image frames are segmented are labeled A, B and C, where region A correspond to the highest resolution region, region C corresponds to the lowest resolution region, and region B has an intermediate resolution between regions A and C. Furthermore, the example head-mounted display device 105 and the example host device 110 of FIG. 7 implement data pipelines for transmitting the image data from the host device 110 to the head-mounted display device 105, with each pipeline mapped to each region and eye combination, that is, Region A—Left Eye, Region A—Right Eye, Region B—Left Eye, Region B—Right Eye, Region C—Left Eye and Region C—Right Eye. As such, for each region and eye combination, the corresponding image data for successive image frames can be transmitted from the host device 110 to the head-mounted display device 105 independently over the respective data pipelines. The graphics controller 135 of the illustrated example rasterizes the image data corresponding to each region/eye combination, with appropriate down-sizing of the Region B and Region C image data as described above, and stores the image data in respective local frame buffers of the system memory 125, as shown. As such, the system memory 125 of the illustrated example provides means for storing the Region A, Region B and Region C image data in the host device 110. Although the local frame buffers are shown as being contiguous in the system memory 125 in the illustrated example, in other examples, some or all of the local frame buffers may be implemented in non-contiguous areas of the system memory 125.

In the illustrated example, the display host controller 140 has its own DMA controller 150, which is used to fetch the rasterized image data for each region—eye combination in a configured or otherwise defined order, such as in the order of region A, B and C, with either left eye first or right eye first, so long as the ordering remains consistent over time. The display host controller 140 transmits the rasterized image data for each region—eye combination to the display device controller 155 of the head-mounted display device 105 (e.g., via its respective date pipeline). Additionally, the display host controller 140 provides metadata specifying the down-sizing ratio(s) of the image data for regions B and C of the left and right foveated image frames, and the position information (e.g., location or window information) where the image data for regions A and B are to be rendered (e.g., interleaved, blitted, etc.) in the native display format of the left and right foveated image frames. As such, the graphics controller 135 of the illustrated example provides means for generating downsized image data for Region B and Region C, and means for determining the metadata specifying the down-sizing ratio(s) of the image data for regions B and C of the left and right foveated image frames, and specifying the position information where the image data for regions A and B are to be rendered in the native display format of the left and right foveated image frames. As described in further detail below, the graphics controller 135 can be implemented by a graphics processor and/or other processor executing instructions, dedicated logic, etc., and/or any combination thereof.

In the head-mounted display device 105, the display device controller 155 receives the data sent from the display host controller 140 of the host device 110. The display device controller 155 has a memory controller in communication with the remote frame buffer 160 of the head-mounted display device 105. The display device controller 155 stores region A and region B image data for the left and right display screens in the remote frame buffer 160 as shown when the image data is received from the host device 110. The remote frame buffer 160 also stores the region C data, at least temporarily, when it is received from the hoist device 110. As such, the remote frame buffer 160 of the illustrated example provides means for storing the region A, B and C image data at the head-mounted display device 105. For example, the host device 110 may transmit the higher resolution image data for the smaller A and/or B regions to the head-mounted display device 105 before transmitting the lower resolution image data for the larger C region of the image frame. When display device controller 155 receives region C image data (and stores the image data, at least temporarily, in the remote frame buffer 160), the display device controller 155 then begins rendering the foveated image frames for the left and right screens, as described above. For example, the display device controller 155 of FIG. 7 includes an example up-sampler 705 to up-sample the downsized image data received for the C region and retrieved from the frame buffer 160 for the B region based on the ratio/resolution metadata received from the host device 110, as described above. As such, the up-sampler 705 of the illustrated example provides means for up-sampling the region B and C image data based on metadata from the host device 110 to generate up-sampled region B and C image data, as described above. The display device controller 155 of FIG. 7 also includes an example renderer 710 to use the position metadata provided by the host device 110 to combine (e.g., via interleaving, blitting, etc.) the image data for regions A and B retrieved from the frame buffer 160 with the image data received for region C when rendering the foveated image frames for the left and right screens of the display 165. As such, the renderer 710 of the illustrated example provides means for combining the region A image data with the up-sampled region B and C image data based on metadata from the host device 110 to render the foveated image frames for the left and right screens of the display 165.

Figure 8:
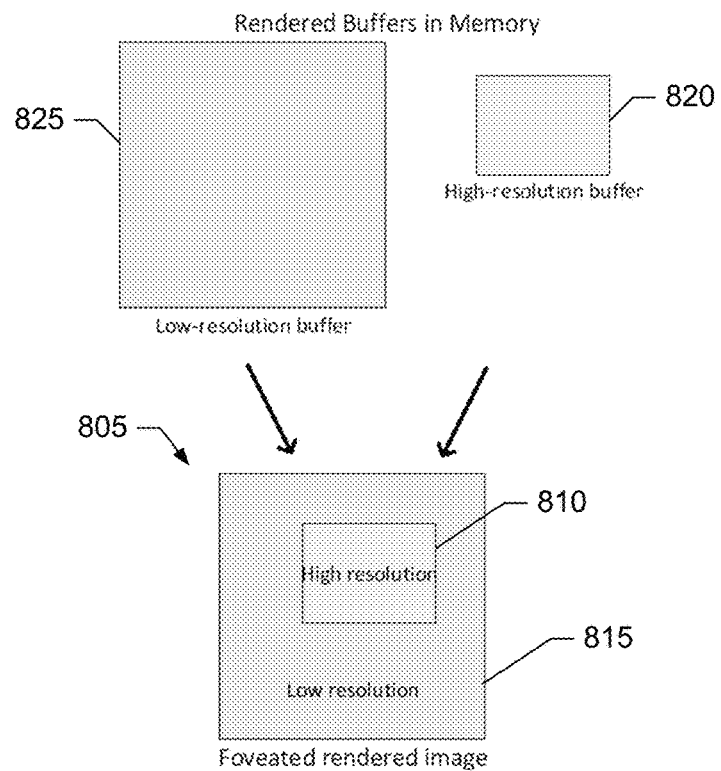
FIG. 8-10 illustrate two example protocols for transferring foveated image data from the host device 110 to the head-mounted display device 105 of FIGS. 1 and/or 7.
Figure 9:
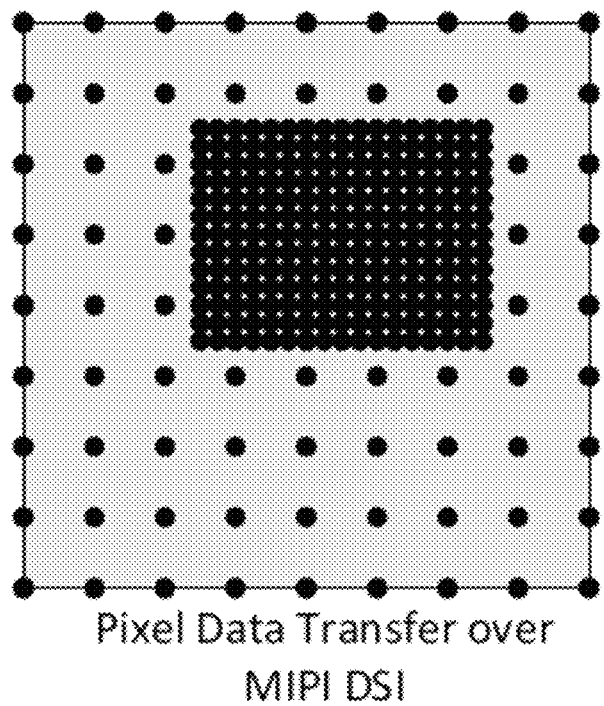
Figure 10:
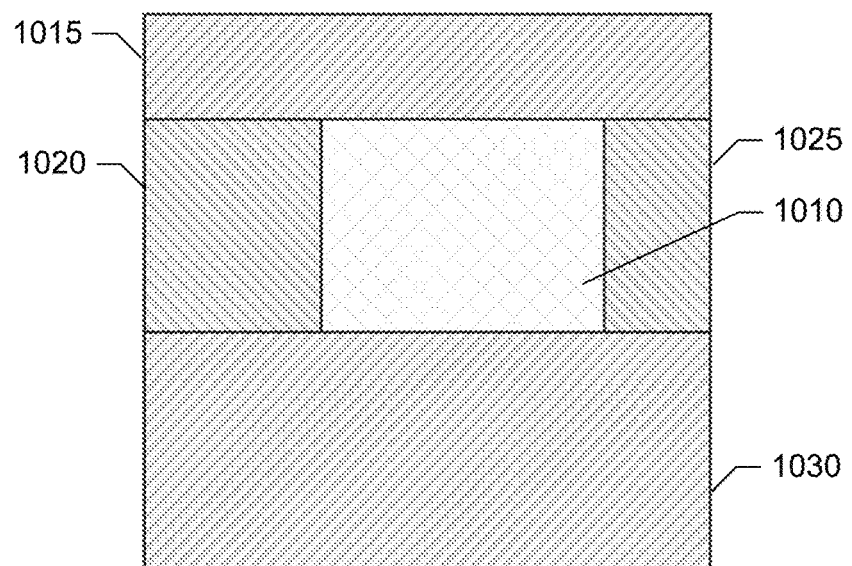

FIG. 8-10 illustrate two example protocols for transferring foveated image data from the host device 110 to the head-mounted display device 105. The example of FIGS. 8-10 corresponds to the rendering of foveated image frames having two regions with two different resolutions, such as the example foveated image frame 205 of FIG. 2. However, the example protocols disclosed herein can be used to transfer image data for foveated image frames having any number of regions with different resolutions, such as the example foveated image frame 420 having three (s) regions 405-415 with different resolutions.

As shown in FIG. 8, an example foveated image frame 805 generated by foveated rendering in the illustrated example includes two example regions 810 and 815 having different resolutions, such as a high resolution and a low resolution. In the illustrated example, region 810 corresponds to the focal point or fovea of the image frame 805 and is rendered at a high resolution (e.g., such as the full resolution supported by the display 165). In the illustrated example, region 815 corresponds to the remainder of the image frame 801 which is in the peripheral vision and is rendered at lower resolution than region 810.

In the illustrated example, the image data for the two image regions having the two different resolutions are stored separately at the host device 110 in two different buffers 820 and 825 in the system memory 125. The display host controller 140 of the host device 110 is provided with the pointers to these two buffers and the position information (e.g., two-dimensional coordinates, window location, etc.) for the high-resolution image region 810 in the image frame 805. When the data transfer is initiated for an image frame, the display host controller 140 of the host device 110 determines which of the two buffers 820-825 from which to obtain the image data based on the position information for the high-resolution image region 810 in the image frame 805. For example, when transmitting data for rendering the low-resolution region 815 of the image frame 805, the display host controller 140 retrieves the image data from the low-resolution buffer 825, whereas when transmitting data for rendering the high-resolution region 810 of the image frame 805, the display host controller 140 retrieves the image data from the high-resolution buffer 820. In some examples, the display host controller 140 of the host device provides the complete image data from the high-resolution buffer 820 to the head-mounted display device 105 before providing any of the image data from the low-resolution buffer 825.

The display protocol(s) used to transfer image data over the data interface 115 from the host device 110 to the head-mounted display device 105 is(are) enhanced, as disclosed herein, to support transfer of the multi-resolution image data used to render foveated image frames at the head-mounted display device 105. FIG. 9 illustrates example protocol enhancements when the MIPI DSI protocol is used to transfer the image data over the data interface 115. FIG. 10 illustrates example protocol enhancements when the Transfer Agnostic Display (TAD) protocol is used to transfer the image data over the data interface 115. TAD is an upcoming VESA standard that defines a display protocol for use over any physical interconnect.

In the illustrated example of FIG. 9, which corresponds to MIPI DSI, a meta-data packet is sent by the host device 110 to the head-mounted display device 105 via the data interface 115 to convey the information about the two regions 810 and 815 of the foveated image frame 805 to be rendered at the head-mounted display device 105. The metadata packet is sent before the transfer of the actual pixel data from the buffers 820 and 825. The metadata packet includes position information (e.g., coordinates) of the high-resolution region 810 of the image frame 805. The metadata packet also contains the resolution information (e.g., such as the N:1 down-sizing ratio) of the image data (e.g., from the buffer 825) to be used to render the low-resolution region 810. For example, the resolution information may specify the down-sizing ratio in the number of pixels represented by a single pixel in the low-resolution region 815. The display device controller 155 of the head-mounted display device 105 uses this metadata packet to determine the different resolution boundaries of the foveated image frame 805 to be rendered, thereby enabling proper interpretation of the incoming data. At the host device 110, the pixel data is read from both the low-resolution and high-resolution buffers 820-825 by the display host controller 140. In some examples, the pixels actually present in each scanline from both the buffers 820-825 are sent by the display host controller 140 in raster order.

In the illustrated example of FIG. 10, which corresponds to TAD, the header of each data packet specifies the position information (e.g., two-dimensional coordinates) of the rectangular region corresponding to the pixel data in that packet. A field to specify the resolution (e.g., down-sizing ratio) of the region is added to the header. The multi-resolution image 805 is segmented into example rectangular regions 1005-1030, with the image data in a given region having the same resolution throughout the region. The regions 1005-1030 are transferred as separate packets, with the header of each packet specifying the appropriate position information (e.g., coordinates) and resolution (e.g., down-sizing ratio) for the region corresponding to that packet. In this way, image data for the image frame 805 is transferred for display at the head-mounted display device 105.

Figure 11:
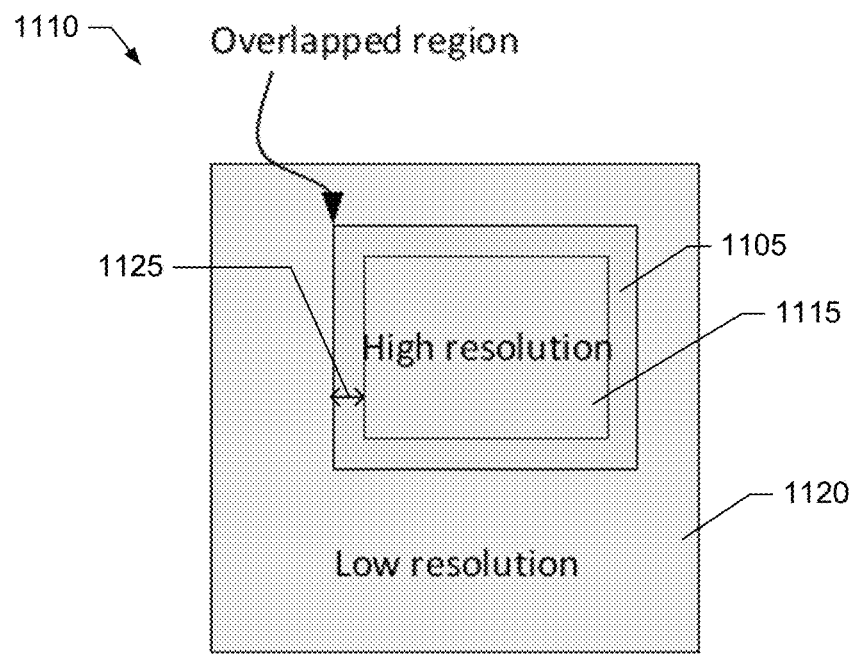
FIG. 11 illustrates an example overlapping region of a foveated image, which including portions of an example high-resolution region and an example low-resolution region.

Returning to FIG. 7, the example display device controller 155 of the example head-mounted display device 105 illustrated therein includes an example filter 715 to filter (e.g., smooth) data in overlapping region(s) of a foveated image frame, with the overlapping region(s) being defined between adjacent regions having different resolutions in the foveated image frame. FIG. 11 illustrates an example overlapping region 1105 defined for an example foveated image frame 1110. The overlapping region 1105 of the illustrated example includes portions of an example high-resolution region 1115 and an example low-resolution region 1120. The distinct borders between the low-resolution region 1120 and the high-resolution region 1115 can result in sudden transitions in image quality. Such transitions may not be realistic and/or may not appear appropriate to the human eye. To mitigate this in the illustrated example, the display host controller 140 of the host device 110 defines the example overlapping region 1105 between the low-resolution region 1120 and the high-resolution region 1115. In the illustrated example, the overlapping region 1105 is defined to be a strip around the high-resolution region 1115 that includes portions of the image data associated with the high-resolution region 1115 and portions of the image data associated with the low-resolution region 1120. For example, the display host controller 140 of the host device 110 may define the overlapping region 1105 as a width 1125 specified as a number of overlapping pixels, and may send this information as metadata to the display device controller 155 of the head-mounted display device 105. In the illustrated example, the filter 715 performs filtering on the image data in the portion of the high-resolution region 1115 included in the overlapping region 1105 and the image data in the portion of the low-resolution region 1120 included in the overlapping region 1105 to generate a smooth transition between the low-resolution region 1120 and the high-resolution region 1115. The filter 715 can implement any appropriate type and/or combination of filtering operations, such as data smoothing, averaging, blurring, etc. As such, the filter 715 of the illustrated example provides means for filtering, based on metadata from the host device 110, the image data in the portion of the high-resolution region 1115 included in the overlapping region 1105 and the image data in the portion of the low-resolution region 1120 included in the overlapping region 1105 to generate a smooth transition between the low-resolution region 1120 and the high-resolution region 1115.

FIG. 12 illustrates example performance results 1200 that can be achieved with foveated image rendering as performed by the example head-mounted display device 105 and the example host device 110 of FIGS. 1 and/or 7. The performance results 1200 correspond to rendering a foveated image frame, such as the example foveated image frame 420, which has three (3) regions of different resolutions, such as the example regions 405-415. As shown in the example of FIG. 12, foveated image rendering as disclosed herein can reduce data throughput associated with the display host controller 140 of the host device 110 and data throughput over the data interface 115 by a factory of ten (10) relative to prior systems employing head-mounted display device.

Although this disclosure describes foveated image rendering techniques in the context of the example head-mounted display system 100 of FIG. 1 including the example head-mounted display device 105 and the example host device 110, foveated image rendering as disclosed herein is not limited thereto. On the contrary, foveated image rendering as disclosed herein can be used to render multi-resolution image frames on any display device. For example, foveated image rendering as disclosed herein can be used to render multi-resolution image frames on remote display devices, such as information kiosks, monitoring display screens, gaming consoles, etc., separated by any distance from a host device providing the image data to be rendered.

While an example manner of implementing the example head-mounted display system 100 is illustrated in FIGS. 1-12, one or more of the elements, processes and/or devices illustrated in FIGS. 1-12 may be combined, divided, re-arranged, omitted, eliminated and/or implemented in any other way. Further, the example head-mounted display device 105, the example host device 110, the example data interface 115, the example central processing unit 120, the example system memory 125, the example memory controller 130, the example graphics controller 135, the example display host controller 140, the example DMA controllers 145-150, the example display device controller 155, the example remote frame buffer 160, the example display 165, the example up-sampler 705, the example renderer 710, the example filter 715 and/or, more generally, the example head-mounted display system 100 of FIGS. 1-12 may be implemented by hardware, software, firmware and/or any combination of hardware, software and/or firmware. Thus, for example, any of the example head-mounted display device 105, the example host device 110, the example data interface 115, the example central processing unit 120, the example system memory 125, the example memory controller 130, the example graphics controller 135, the example display host controller 140, the example DMA controllers 145-150, the example display device controller 155, the example remote frame buffer 160, the example display 165, the example up-sampler 705, the example renderer 710, the example filter 715 and/or, more generally, the example head-mounted display system 100 could be implemented by one or more analog or digital circuit(s), logic circuits, programmable processor(s), programmable controller(s), graphics processing unit(s) (GPU(s)), graphics engine(s) (GFX engines), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example head-mounted display device 105, the example host device 110, the example data interface 115, the example central processing unit 120, the example system memory 125, the example memory controller 130, the example graphics controller 135, the example display host controller 140, the example DMA controllers 145-150, the example display device controller 155, the example remote frame buffer 160, the example display 165, the example up-sampler 705, the example renderer 710, the example filter 715 and/or, more generally, the example head-mounted display system 100 is/are hereby expressly defined to include a non-transitory computer readable storage device or storage disk such as a memory, a digital versatile disk (DVD), a compact disk (CD), a Blu-ray disk, etc. including the software and/or firmware. Further still, the example head-mounted display system 100 may include one or more elements, processes and/or devices in addition to, or instead of, those illustrated in FIGS. 1-12, and/or may include more than one of any or all of the illustrated elements, processes and devices.

Figure 13:
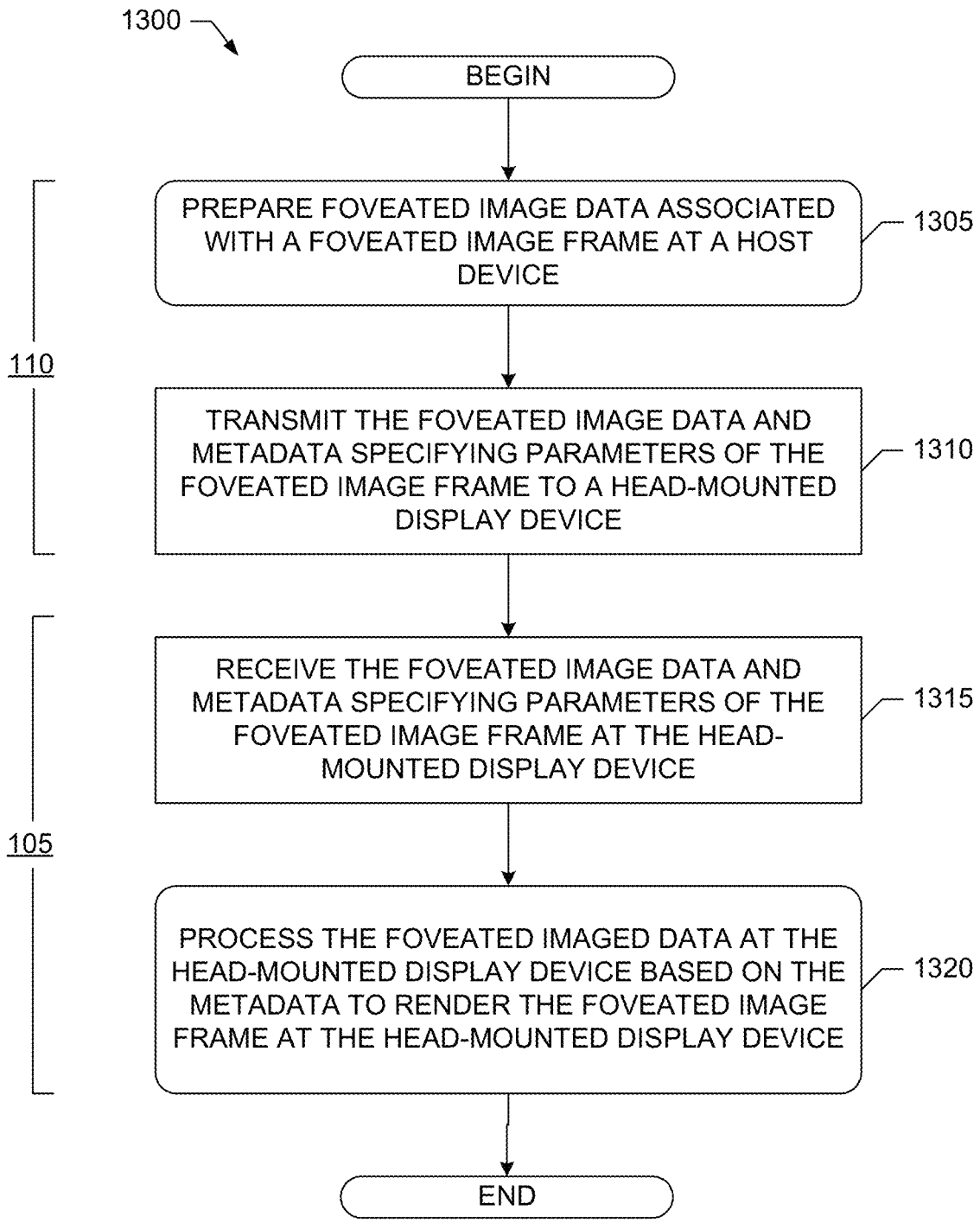
FIG. 13 is a flowchart representative of example computer readable instructions that may be executed to implement foveated image rendering in the example system of FIG. 1.
Figure 14:
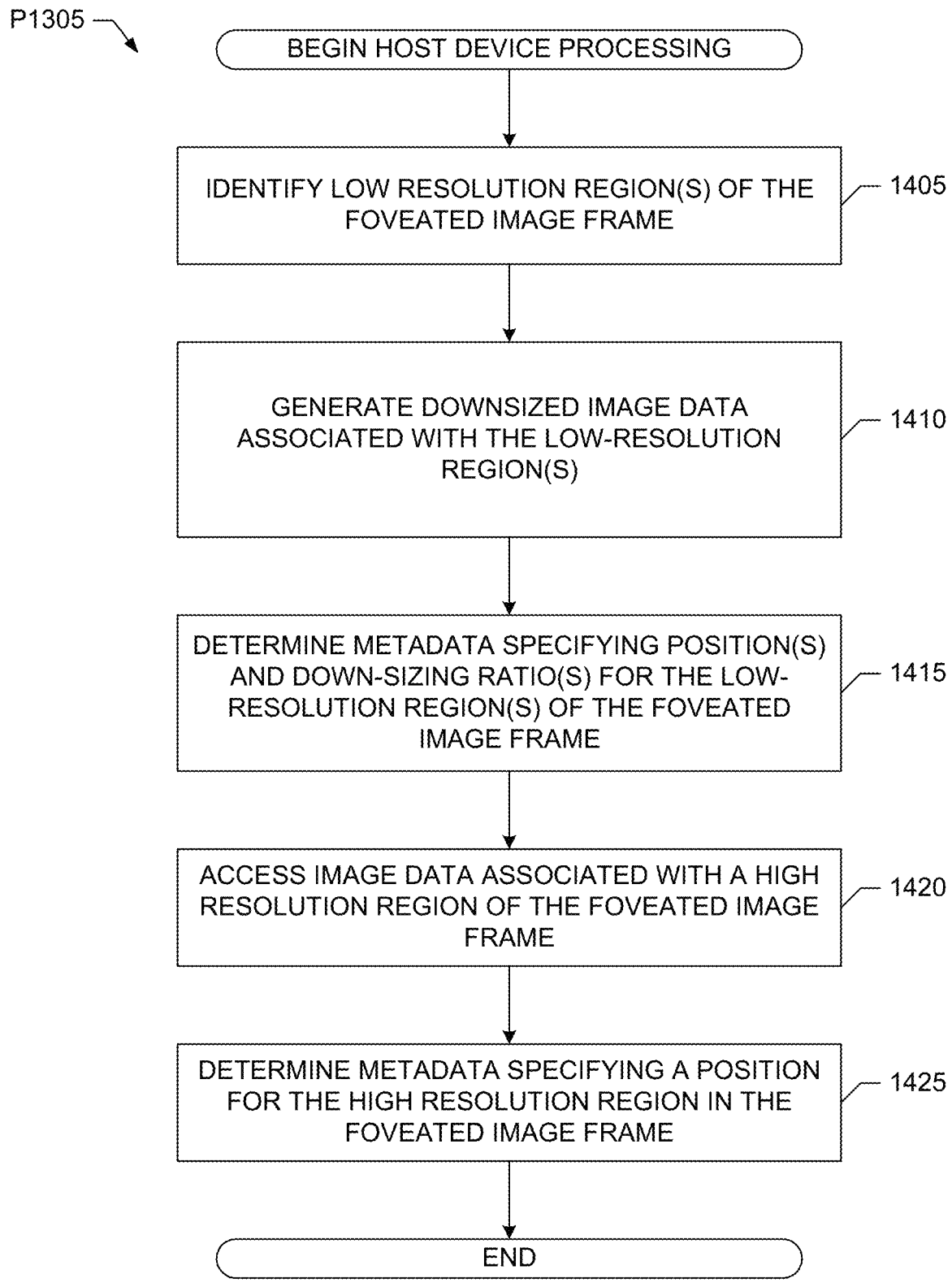
FIG. 14 is a flowchart representative of example computer readable instructions that may be executed to implement the example host device of FIGS. 1 and/or 7.
Figure 15:
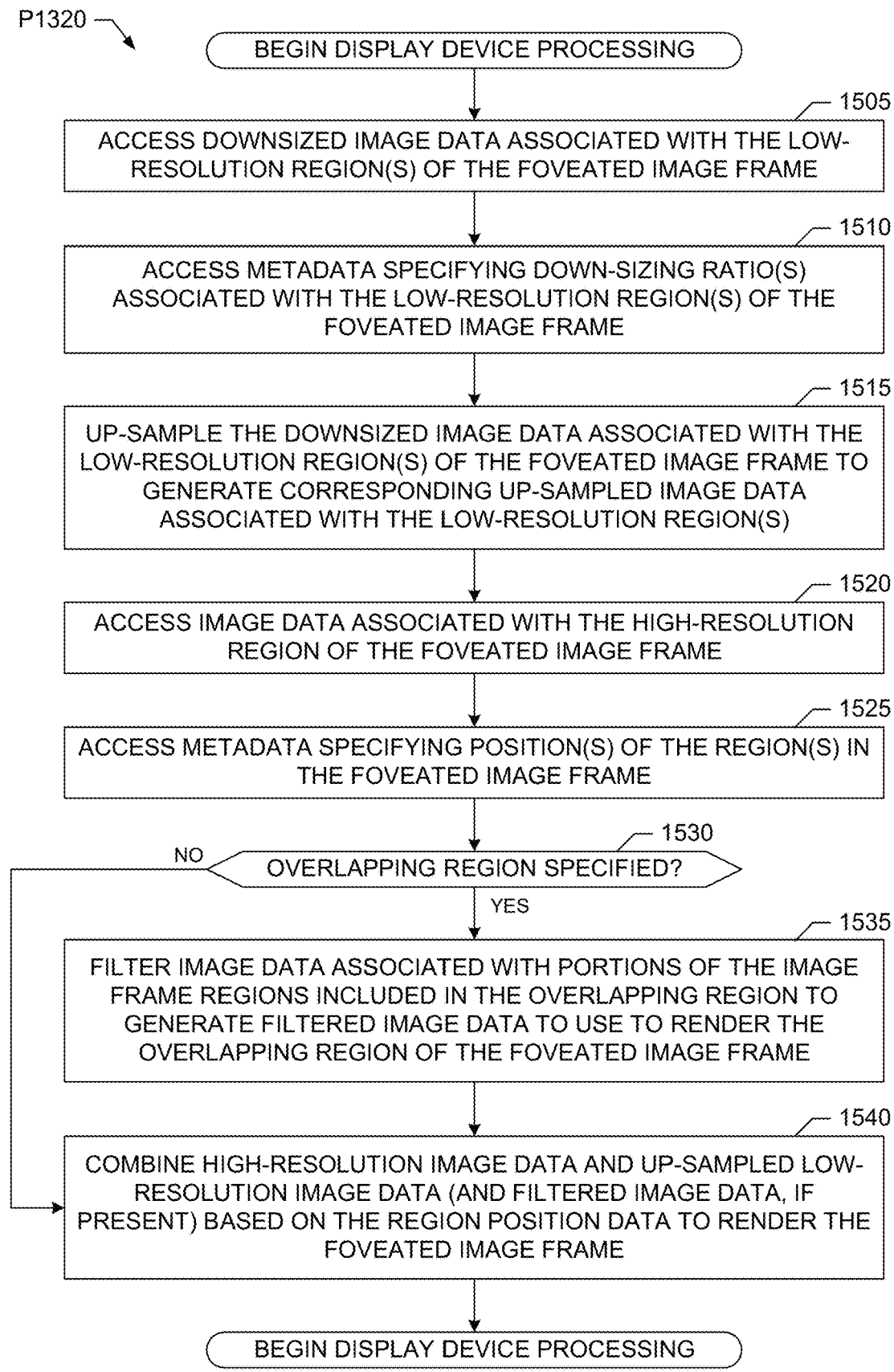
FIG. 15 is a flowchart representative of example computer readable instructions that may be executed to implement the example head-mounted display device of FIGS. 1 and/or 7.

Flowcharts representative of example hardware logic or machine readable instructions for implementing one or more of the example head-mounted display system 100, the example head-mounted display device 105 and/or the example host device 110 are shown in FIGS. 13-15. In these examples, the machine readable instructions comprise one or more programs for execution by a processor, such as the processor 1612 and/or the processor 1712 shown in the example processor platform 1600 and/or the example processing platform 1700 discussed below in connection with FIG. 16 and FIG. 17. The one or more programs, or portion(s) thereof, may be embodied in software stored on one or more non-transitory computer readable storage media such as a CD-ROM, a floppy disk, a hard drive, a DVD, a Blu-ray disk™, or a memory associated with the processor 1612 and/or the processor 1712, but the entire program or programs and/or parts thereof could alternatively be executed by a device other than the processor 1612 and/or the processor 1712, and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 13-15, many other methods of implementing the example head-mounted display system 100, the example head-mounted display device 105 and/or the example host device 110 may alternatively be used. For example, with reference to the flowcharts illustrated in FIGS. 13-15, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 13-15 may be implemented using executable instructions (e.g., computer and/or machine readable instructions) stored on one or more non-transitory computer and/or machine readable media such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. Also, as used herein, the terms "computer readable" and "machine readable" are considered equivalent unless indicated otherwise.

An example program 1300 that may be executed to implement the example head-mounted display system 100 of FIG. 1 is illustrated in FIG. 13. In the illustrated example of FIG. 13, the processing at blocks 1305 and 1310 is performed by the example host device 110, and the processing at blocks 1315 and 1320 is performed by the example head-mounted display device 105, as shown. With reference to the preceding figures and corresponding written descriptions, execution of the example program 1300 of FIG. 13 begins at block 1305 at which the host device 110 prepares, as described above, foveated image data (e.g., multi-resolution data) associated with a foveated image frame to be rendered at the head-mounted display device 105. An example program that may be executed to perform the processing at block 1305 is illustrated in FIG. 14, which is described in further detail below. At block 1310, the example display host controller 140 of the host device 110 transmits, as described above, the foveated image data prepared at block 1305 and metadata specifying parameters of the foveated image frame (e.g., such as resolution/down-sizing information and position(s) associated with region(s) of the foveated image frame) to the head-mounted display device 105 via the example data interface 115.

At block 1315, the example display device controller 155 of the head-mounted display device 105 receives, as described above, the foveated image data and the metadata specifying parameters of the foveated image frame from the host device 110 via the data interface 115. At block 1320, the head-mounted display device 105 processes, as described above, the received foveated image data based on the received metadata to render the foveated image frame on the example display 165 of the head-mounted display device 105. An example program that may be executed to perform the processing at block 1320 is illustrated in FIG. 15, which is described in further detail below.

An example program P1305 that may be executed to implement the example host device 110 of FIG. 1 and/or to perform the processing at block 1305 of FIG. 13 is illustrated in FIG. 14. With reference to the preceding figures and corresponding written descriptions, execution of the example program P1305 of FIG. 14 begins at block 1405 at which the example graphics controller 135 of the host device 110 identifies the low-resolution region(s) (e.g., such as the regions 410 and 415) of a foveated image frame (e.g., such as the image frame 420) to be rendered at the head-mounted display device 105. At block 1410, the graphics controller 135 generates, as described above, downsized image data associated with the low-resolution region(s) of the foveated image frame. At block 1415, the graphics controller 135 determines metadata specifying position(s) (e.g., such as two-dimensional coordinate, window positions, etc.) and down-sizing ratio(s) (and/or or other resolution descriptive information) for the low-resolution region(s) of the foveated image frame, as described above. At block 1420, the graphics controller 135 accesses, as described above, image data (e.g., such as the image data 505) associated with one or more high-resolution region(s) (e.g., such as the region 405) of the foveated image frame (e.g., such as the image frame 420) to be rendered at the head-mounted display device 105. At block 1425, the graphics controller 135 determines metadata specifying position(s) (e.g., such as two-dimensional coordinates, window positions, etc.) of the high-resolution region(s) of the foveated image frame, as described above.

An example program P1320 that may be executed to implement the example head-mounted display device 105 of FIG. 1 and/or to perform the processing at block 1320 of FIG. 13 is illustrated in FIG. 15. With reference to the preceding figures and corresponding written descriptions, execution of the example program P1320 of FIG. 15 begins at block 1505 at which the example up-sampler 705 of the example display device controller 155 of the head-mounted display device 105 accesses downsized image data received from the host device 110 and associated with the low-resolution region(s) (e.g., such as the regions 410 and 415) of the foveated image frame (e.g., such as the image frame 420) to be rendered, as described above. At block 1510, the up-sampler 705 accesses metadata received from the host device 110 and specifying down-sizing ratios (and/or other resolution information) associated with the low-resolution region(s) of the foveated image frame, as described above. At block 1515, the up-sampler 705 up-samples, as described above, the downsized image data associated with the low-resolution region(s) of the foveated image frame to generate corresponding up-sampled image data associated with the low-resolution region(s). For example, the up-sampled image data may correspond to the full resolution of the display 165 of the head-mounted display device 105.

At block 1520, the example renderer 710 of the display device controller 155 of the head-mounted display device 105 accesses image data received form the host device 110 and associated with one or more high-resolution region(s) (e.g., such as the region 405) of the foveated image frame (e.g., such as the image frame 420) to be rendered at the head-mounted display device 105, as described above. At block 1525, the renderer 710 accesses metadata received from the host device 110 and specifying the position(s) (e.g., two-dimensional coordinates, window positions, etc.) of the region(s) in the foveated image frame to be rendered, as described above. At block 1530, the display device controller 155 determines whether metadata specifying one or more over-lapping region(s) (e.g., such as the over-lapping region 1105) in the foveated image frame has been received from the host device 110. If metadata specifying one or more over-lapping region(s) has been received, processing proceeds to block 1535. Otherwise, processing proceeds to block 1540.

At block 1535, the example filter 715 of the display device controller 155 of the head-mounted display device 105 filters, as described above, the image data associated with portions of the image frame regions included in the overlapping region to generate filtered image data to use to render the overlapping region of the foveated image frame. At block 1540, the renderer 710 combines, as described above, the high-resolution image data associated with the high-resolution image regions and the up-sampled image data associated with the low-resolution image regions (and with any filtered image data associated with overlapping region(s), if specified) based on the received region position data to render the foveated image frame on the display 165 of the head-mounted display device 105.

Figure 16:
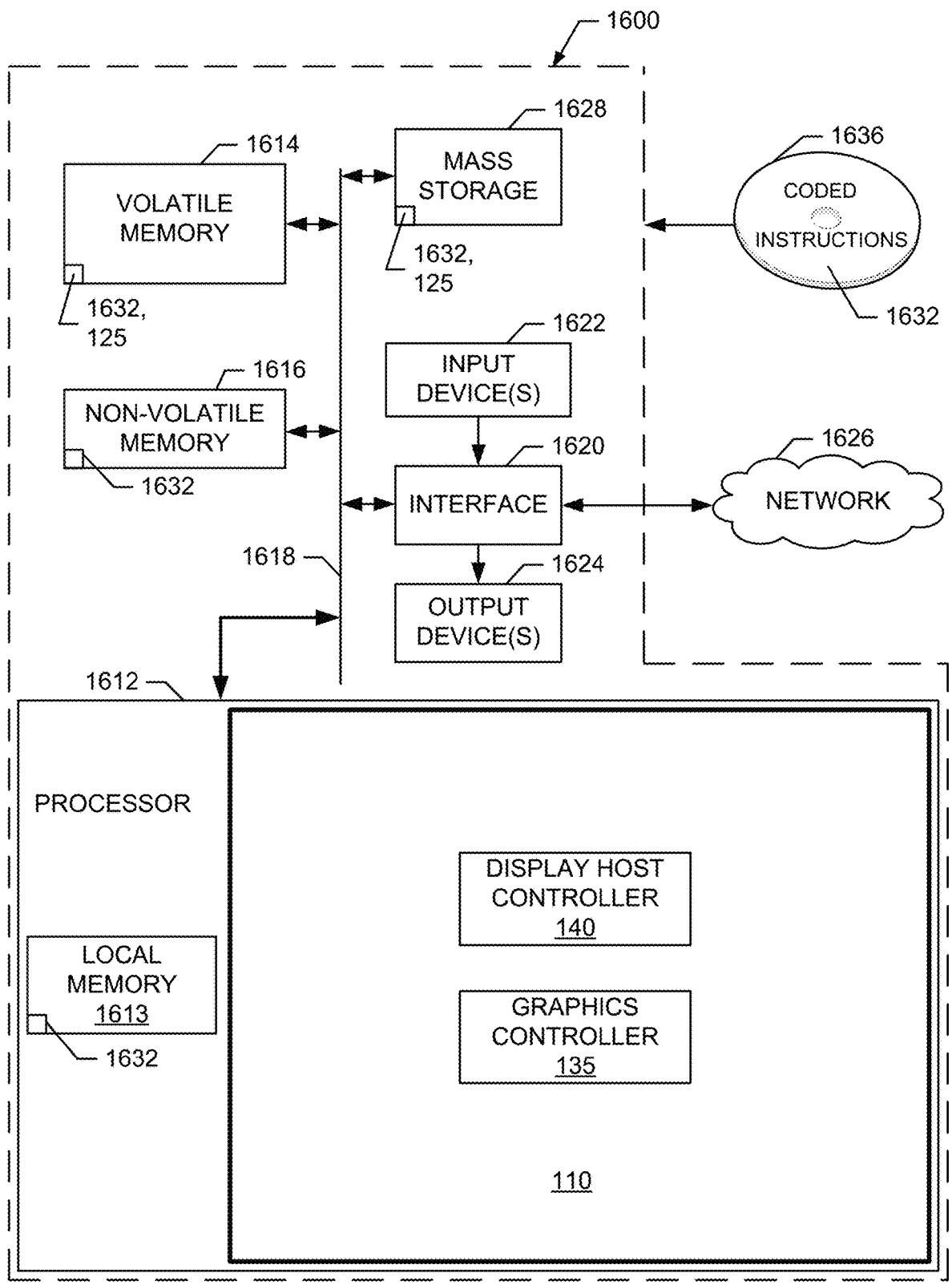
FIG. 16 is a block diagram of an example processor platform structured to execute the example computer readable instructions of FIGS. 13 and/or 14 to implement the example host device of FIGS. 1 and/or 7.

FIG. 16 is a block diagram of an example processor platform 1600 structured to execute the instructions of FIGS. 13 and/or 14 to implement the example host device 110 of FIGS. 1 and/or 7. The processor platform 1600 can be, for example, a server, a computer, a workstation a game console, a mobile phone (e.g., a smartphone), a tablet device (such as an iPad™), an Internet appliance, a drone, an autonomous vehicle, a self-leaning machine (e.g., a neural network), or any other type of computing device.

The processor platform 1600 of the illustrated example includes a processor 1612, which may implement the example CPU 120 of FIG. 1. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor 1612 may be a semiconductor based (e.g., silicon based) device. In this example, the processor 1612 implements the example graphics controller 135 and/or the example display host controller 140.

The processor 1612 of the illustrated example includes a local memory 1613 (e.g., a cache). The processor 1612 of the illustrated example is in communication with a main memory including a volatile memory 1614 and a non-volatile memory 1616 via a link 1618. The link 1618 may be implemented by a bus, one or more point-to-point connections, etc., or a combination thereof. The volatile memory 1614 may be implemented by Synchronous Dynamic Random Access Memory (SDRAM), Dynamic Random Access Memory (DRAM), RAMBUS Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller, such as the example memory controller 130 and DMA controllers 145-150 of FIGS. 1 and/or 7. In some examples, the volatile memory 1614 implements the example system memory 125 of FIGS. 1 and/or 7.

The processor platform 1600 of the illustrated example also includes an interface circuit 1620. The interface circuit 1620 may be implemented by any type of interface standard, such as an Ethernet interface, a universal serial bus (USB), a PCI express interface, a DP interface, an eDP interface, an HDMI interface, a MIPI DSI interface, a Bluetooth® interface, an IR interface, a UW interface, an NFC interface, etc. In some examples, the interface circuit 1620 implements the example data interface 115 and FIGS. 1 and/or 7.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1600, can allow the user to control the computer system and provide data to the computer using physical gestures, such as, but not limited to, hand or body movements, facial expressions, and face recognition.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem, a residential gateway, a wireless access point, and/or a network interface card to facilitate exchange of data with external machines (e.g., computing devices of any kind) via a network 1626. The communication can be via, for example, an Ethernet connection, a digital subscriber line (DSL) connection, a telephone line connection, coaxial cable system, a satellite system, a line-of-site wireless system, a cellular telephone system, etc.).

The processor platform 1600 of the illustrated example also includes one or more mass storage devices 1628 for storing software and/or data. Examples of such mass storage devices 1628 include floppy disk drives, hard drive disks, solid state drives, compact disk drives, Blu-ray disk drives, redundant array of independent disks (RAID) systems, and digital versatile disk (DVD) drives. In some examples, the mass storage device(s) 1628 implement the example system memory 125 of FIGS. 1 and/or 7.

The machine executable instructions 1632 corresponding to the instructions of FIGS. 13 and/or 14 may be stored in the mass storage device 1628, in the volatile memory 1614, in the non-volatile memory 1616, in the local memory 1613 and/or on a removable non-transitory computer readable storage medium, such as a CD or DVD 1636.

Figure 17:
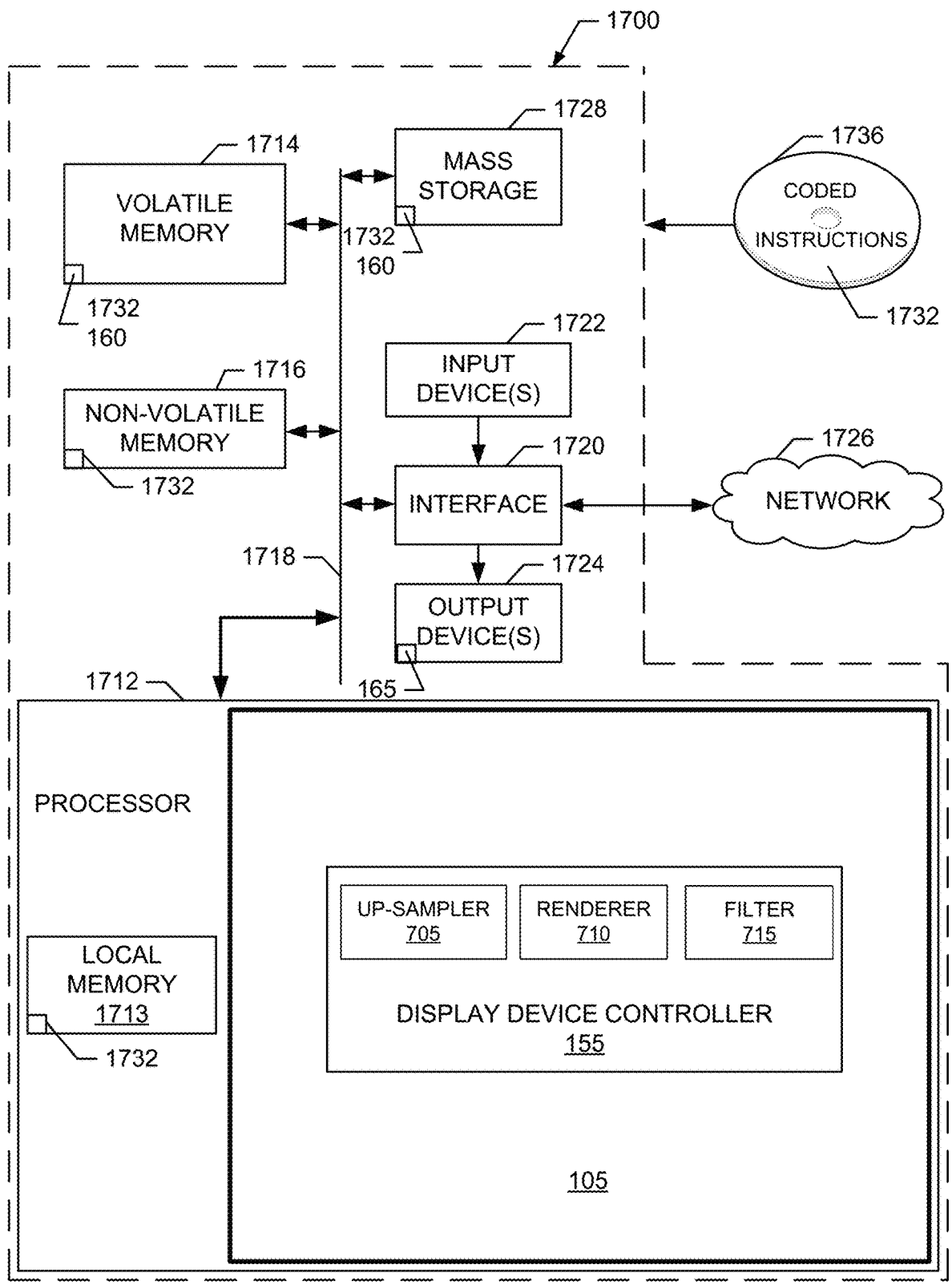
FIG. 17 is a block diagram of an example processor platform structured to execute the example computer readable instructions of FIGS. 13 and/or 15 to implement the example head-mounted display device of FIGS. 1 and/or 7.

FIG. 17 is a block diagram of an example processor platform 1700 structured to execute the instructions of FIGS. 14 and/or 16 to implement the example head-mounted display device 105 of FIGS. 1 and/or 7. The processor platform 1700 can be, for example, a VR headset, an AR headset, smart glasses, a wearable display device, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs or controllers from any desired family or manufacturer. The hardware processor 1712 may be a semiconductor based (e.g., silicon based) device. In this example, the processor 1712 implements the example display device controller 155, the example up-sampler 705, the example renderer 710 and/or the example filter 715.

The processor 1712 of the illustrated example includes a local memory 1713 (e.g., a cache). The processor 1712 of the illustrated example is in communication with a main memory including a volatile memory 1714 and a non-volatile memory 1716 via a link 1718. The link 1718 may be implemented by a bus, one or more point-to-point connections, etc., or a combination thereof. The volatile memory 1714 may be implemented by SDRAM, DRAM, RDRAM® and/or any other type of random access memory device. The non-volatile memory 1716 may be implemented by flash memory and/or any other desired type of memory device. Access to the main memory 1714, 1716 is controlled by a memory controller. In some examples, the volatile memory 1714 implements the example remote frame buffer 160 of FIGS. 1 and/or 7

The processor platform 1700 of the illustrated example also includes an interface circuit 1720. The interface circuit 1720 may be implemented by any type of interface standard, such as an Ethernet interface, a USB, a PCI express interface, a DP interface, an eDP interface, an HDMI interface and/or a MIPI DSI interface, a Bluetooth® interface, an IR interface, a UW interface, an NFC interface, etc. In some examples, the interface circuit 1720 implements the example data interface 115 and FIGS. 1 and/or 7.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a camera (still or video), a button, a touchscreen, a voice recognition system and/or any other human-machine interface. Also, many systems, such as the processor platform 1700, can allow the user to control the computer system and provide data to the computer using physical gestures, such as, but not limited to, hand or body movements, facial expressions, and face recognition.

One or more output devices 1724 are also connected to the interface circuit 1720 of the illustrated example. The output devices 1724 can be implemented, for example, by display devices (e.g., LED, OLED, LCD, a CRT display, IPS display, a touchscreen, etc.), a tactile output device and/or speakers. The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726. The communication can be via, for example, an Ethernet connection, a DSL, a telephone line connection, coaxial cable system, a satellite system, a line-of-site wireless system, a cellular telephone system, etc.).

The processor platform 1700 of the illustrated example also includes one or more mass storage devices 1728 for storing software and/or data. Examples of such mass storage devices 1728 include floppy disk drives, hard drive disks, solid state drives, compact disk drives, Blu-ray disk drives, RAID systems, DVD drives. In some examples, the mass storage device(s) 1728 implement the example remote frame buffer 160 of FIGS. 1 and/or 7.

The machine executable instructions 1732 corresponding to the instructions of FIGS. 13 and/or 15 may be stored in the mass storage device 1728, in the volatile memory 1714, in the non-volatile memory 1716, in the local memory 1713 and/or on a removable non-transitory computer readable storage medium, such as a CD or DVD 1736.

The foregoing disclosure provides examples of implementing foveated image rendering for head-mounted display devices. The following further examples, which include subject matter such as a head-mounted display to implement foveated image rendering, at least one computer-readable storage medium including instructions that, when executed by at least one processor, cause the at least one processor to implement foveated image rendering for a head-mounted display device, an apparatus including means to implement foveated image rendering for a head-mounted display device, and a method to implement foveated image rendering for a head-mounted display device, are disclosed herein. The disclosed examples can be implemented individually and/or in one or more combinations.

Example 1 is a head-mounted display device including a display and a frame buffer to store first image data and second image data for an image frame, the first image data having a first resolution and the second image data having a second resolution lower than the first resolution, the first image data and the second image data obtained from a host device via a data interface. The head-mounted display device of example 1 also includes a device controller to up-sample the second image data based on first metadata from the host device to generate up-sampled second image data having the first resolution, combine the first image data and the up-sampled second image data based on second metadata from the host device to render a foveated image frame on the display.

Example 2 includes the subject matter of example 1, wherein the first metadata and the second metadata are included in a metadata packet from the host device, the first and second metadata to be obtained before the first image data and the second image data.

Example 3 includes the subject matter of example 1, wherein the first metadata, the second metadata and the second image data are included in a data packet from the host device.

Example 4 includes the subject matter of any one of examples 1 to 3, wherein the first metadata is to specify at least one of the second resolution of the second image data or a down-sizing ratio corresponding to the second resolution, and the second metadata is to specify a position of the first image data in the foveated image frame.

Example 5 includes the subject matter of example 4, wherein the device controller is further to: up-sample third image data having a third resolution from the host device to generate up-sampled third image data having the first resolution, the third resolution lower than the first resolution and the second resolution, the device controller to up-sample the third image data based on third metadata from the host device, the third metadata to specify at least one of the third resolution of the second image data or a down-sizing ratio corresponding to the third resolution; and combine the first image data, the up-sampled second image data and the up-sampled third image data based on the second metadata and fourth metadata from the host device to render the foveated image frame on the display, the fourth metadata to specify a position of the second image data in the foveated image frame.

Example 6 includes the subject matter of example 5, wherein the first image data is to correspond to a first region of the foveated image frame, the second image data is to correspond to a second region of the foveated image frame, the third image data is to correspond to a third region of the foveated image frame, the second region is included in the third region, and the first region is included in the second region.

Example 7 includes the subject matter of any one of examples 1 to 3, wherein the first image data is to correspond to a first region of the foveated image frame, the second image data is to correspond to a second region of the foveated image frame, the first region is included in the second region, and the device controller is further to: access third metadata, the third metadata to specify an overlapping region of the foveated image frame, the overlapping region including a portion of the first region and a portion of the second region, the third metadata from the host device; and filter the first image data associated with the portion of the first region included in the overlapping region and the up-sampled second image data associated with the portion of the second region included in the overlapping region to generate filtered image data to render the overlapping region of the foveated image frame.

Example 8 includes the subject matter of any one of examples 1 to 3, wherein the first resolution of the first image data is to correspond to a resolution of the display.

Example 9 includes one or more non-transitory computer readable storage media including computer readable instructions which, when executed, cause one or more processors of a head-mounted display device to at least: access first image data and second image data, the first image data to have a first resolution and the second image data to have a second resolution lower than the first resolution; up-sample the second image data based on first metadata to generate up-sampled second image data, the up-sampled second image data to have the first resolution; and combine the first image data and the up-sampled second image data based on second metadata to render a foveated image frame on a display of the head-mounted display device.

Example 10 includes the subject matter of example 9, wherein the first metadata and the second metadata are included in a metadata packet from a host device, the metadata packet obtained before the first image data and the second image data.

Example 11 includes the subject matter of example 9, wherein the first metadata, the second metadata and the second image data are included in a data packet from a host device.

Example 12 includes the subject matter of any one of examples 9 to 11, wherein the first metadata is to specify at least one of the second resolution of the second image data or a down-sizing ratio corresponding to the second resolution, and the second metadata is to specify a position of the first image data in the foveated image frame.

Example 13 includes the subject matter of example 12, wherein the instructions, when executed, further cause the one or more processors to: up-sample third image data having a third resolution from the host device to generate up-sampled third image data having the first resolution, the third resolution lower than the first resolution and the second resolution, the one or more processors to up-sample the third image data based on third metadata from the host device, the third metadata to specify at least one of the third resolution of the second image data or a down-sizing ratio corresponding to the third resolution; and combine the first image data, the up-sampled second image data and the up-sampled third image data based on the second metadata and fourth metadata from the host device to render the foveated image frame on the display, the fourth metadata to specify a position of the second image data in the foveated image frame.

Example 14 includes the subject matter of example 13, wherein the first image data is to correspond to a first region of the foveated image frame, the second image data is to correspond to a second region of the foveated image frame, the third image data is to correspond to a third region of the foveated image frame, the second region is included in the third region, and the first region is included in the second region.

Example 15 includes the subject matter of any one of examples 9 to 11, wherein the first image data is to correspond to a first region of the foveated image frame, the second image data is to correspond to a second region of the foveated image frame, the first region is included in the second region, and the instructions, when executed, further cause the one or more processors to filter the first image data associated with a portion of the first region included in an overlapping region of the foveated image frame and the up-sampled second image data associated with a portion of the second region included in the overlapping region of the foveated image frame to generate filtered image data to render the overlapping region of the foveated image frame, the overlapping region of the foveated image frame specified in third metadata from the host device.

Example 16 is an apparatus to implement foveated image rendering. The apparatus of example 16 includes means for storing first image data and second image data from a host device, the first image data having a first resolution and the second image data having a second resolution lower than the first resolution. The apparatus of example 16 also includes means for up-sampling the second image data based on first metadata from the host device to generate up-sampled second image data, the up-sampled second image data to have the first resolution. The apparatus of example 16 further includes means for combining the first image data and the up-sampled second image data based on second metadata from the host device to render a foveated image frame on a display of a head-mounted display device in communication with the host device via the data interface.

Example 17 includes the subject matter of example 16, wherein the first metadata and the second metadata are included in a metadata packet from the host device, the metadata packet obtained before the first image data and the second image data.

Example 18 includes the subject matter of example 16, wherein the first metadata, the second metadata and the second image data are included in a data packet from the host device.

Example 19 includes the subject matter of any one of examples 16 to 18, wherein the first metadata is to specify at least one of the second resolution of the second image data or a down-sizing ratio corresponding to the second resolution, and the second metadata is to specify a position of the first image data in the foveated image frame.

Example 20 includes the subject matter of example 19, wherein: the means for up-sampling is further to up-sample third image data having a third resolution from the host device to generate up-sampled third image data having the first resolution, the third resolution lower than the first resolution and the second resolution, the means for up-sampling to up-sample the third image data based on third metadata from the host device, the third metadata to specify at least one of the third resolution of the second image data or a down-sizing ratio corresponding to the third resolution; and the means for combining is further to combine the first image data, the up-sampled second image data and the up-sampled third image data based on the second metadata and fourth metadata from the host device to render the foveated image frame on the display, the fourth metadata to specify a position of the second image data in the foveated image frame.

Example 21 includes the subject matter of example 20, wherein the first image data is to correspond to a first region of the foveated image frame, the second image data is to correspond to a second region of the foveated image frame, the third image data is to correspond to a third region of the foveated image frame, the second region is included in the third region, and the first region is included in the second region.

Example 22 includes the subject matter of any one of examples 16 to 18, wherein the first image data is to correspond to a first region of the foveated image frame, the second image data is to correspond to a second region of the foveated image frame, the first region is included in the second region, and further including means for filtering the first image data associated with a portion of the first region included in an overlapping region of the foveated image frame and the up-sampled second image data associated with a portion of the second region included in the overlapping region of the foveated image frame to generate filtered image data to render the overlapping region of the foveated image frame, the overlapping region of the foveated image frame specified in third metadata from the host device.

Example 23 is a system to implement foveated image rendering. The system of example 23 includes a data interface and a host device to generate downsized image data associated with a low-resolution region of a foveated image frame. The system of example 23 also includes a head-mounted display device in communication with the host device via the data interface. In the system of example 23, the head-mounted display device is to up-sample, based on first metadata from the host device, the downsized image data associated with the low-resolution region of the foveated image frame to generate up-sampled image data associated with the low-resolution region of the foveated image frame, and combine, based on second metadata from the host device, the up-sampled image data associated with the low-resolution region with image data associated with a high-resolution region of the foveated image frame to render the foveated image frame.

Example 24 includes the subject matter of example 23, wherein the head-mounted display device is further to obtain the image data associated with the high-resolution region from the host device.

Example 25 includes the subject matter of example 23, wherein the head-mounted display device is to obtain the image data associated with the high-resolution region from the host device before the downsized image data associated with the low-resolution region is obtained from the host device.

Example 26 includes the subject matter of any one of examples 23 to 25, wherein the head-mounted display device is further to obtain a metadata packet including the first metadata and the second metadata from the host device, the metadata packet to be obtained before the downsized image data associated with the low-resolution region is to be obtained from the host device.

Example 27 includes the subject matter of any one of examples 23 to 25, wherein the head-mounted display device is to obtain the first metadata, the second metadata and the downsized image data in a data packet from the host device.

Example 28 includes the subject matter of any one of examples 23 to 25, wherein the first metadata is to specify a down-sizing ratio associated with the low-resolution region, and the second metadata is to specify a position of the high-resolution region in the foveated image frame.

Example 29 includes the subject matter of example 28, wherein the low-resolution region of the foveated image frame is a first low-resolution region, the down-sizing ratio is a first down-sizing ratio, the host device is further to generate downsized image data associated with a second low-resolution region of the foveated image frame, and the head-mounted display device is further to: —sample, based on third metadata from the host device, the downsized image data associated with the second low-resolution region to generate up-sampled image data associated with the second low-resolution region, the third metadata to specify a second down-sizing ratio associated with the second low-resolution region; and combine, based on the second metadata and fourth metadata received from the host device, the up-sampled image data associated with the second low-resolution region, the up-sampled image data associated with the first low-resolution region and the image data associated with the high-resolution region to render the foveated image frame, the fourth metadata to specify a position of the first low-resolution region in the foveated image frame.

Example 30 is a method to implement foveated image rendering on a head-mounted display device. The method of example 30 includes storing first image data and second image data from a host device, the first image data having a first resolution and the second image data having a second resolution lower than the first resolution. The method of example 30 also includes up-sampling, by executing an instruction with at least one processor, the second image data based on first metadata from the host device to generate up-sampled second image data having the first resolution.

The method of example 30 further includes combining, by executing an instruction with the least one processor, the first image data and the up-sampled second image data based on second metadata from the host device to render a foveated image frame on a display of the head-mounted display device.

Example 31 includes the subject matter of example 30, wherein the first metadata and the second metadata are included in a metadata packet from the host device, the metadata data packed obtained before the first image data and the second image data.

Example 32 includes the subject matter of example 30, wherein the first metadata, the second metadata and the second image data are included in a data packet from the host device.

Example 33 includes the subject matter of any one of examples 30 to 32, wherein the first metadata specifies at least one of the second resolution of the second image data or a down-sizing ratio corresponding to the second resolution, and the second metadata specifies a position of the first image data in the foveated image frame.

Example 34 includes the subject matter of example 33, and further includes up-sampling third image data having a third resolution from the host device to generate up-sampled third image data having the first resolution, the third resolution lower than the first resolution and the second resolution, the up-sampling of the third image data based on third metadata from the host device, the third metadata to specify at least one of the third resolution of the second image data or a down-sizing ratio corresponding to the third resolution, and combining the first image data, the up-sampled second image data and the up-sampled third image data based on the second metadata and fourth metadata from the host device to render the foveated image frame on the display, the fourth metadata to specify a position of the second image data in the foveated image frame.

Example 35 includes the subject matter of example 34, wherein the first image data is to correspond to a first region of the foveated image frame, the second image data is to correspond to a second region of the foveated image frame, the third image data is to correspond to a third region of the foveated image frame, the second region is included in the third region, and the first region is included in the second region.

Example 36 includes the subject matter of any one of examples 30 to 32, wherein the first image data corresponds to a first region of the foveated image frame, the second image data corresponds to a second region of the foveated image frame, the first region is included in the second region, and further including filtering the first image data associated with a portion of the first region included in an overlapping region of the foveated image frame and the up-sampled second image data associated with a portion of the second region included in the overlapping region of the foveated image frame to generate filtered image data to use to render the overlapping region of the foveated image frame, the overlapping region of the foveated image frame specified in third metadata from the host device.

Example 37 includes one or more computer readable storage media including computer readable instructions which, when executed, cause one or more processors to perform the method of any one of examples 30 to 36.

Example 38 is an apparatus including one or more processors to perform the method of any one of examples 30 to 36.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A head-mounted display system comprising:
a display;
a host device to provide first image data and second image data for a foveated image frame to be displayed on the display, the first image data to have a first resolution and the second image data to have a second resolution lower than the first resolution; and
a display controller to:
obtain the first image data and the second image data from the host device;
up-sample the second image data based on first metadata from the host device to generate up-sampled second image data, the up-sampled second image data to have the first resolution;
combine the first image data and the up-sampled second image data based on second metadata from the host device; and
perform, based on third metadata from the host device, a combination of at least two different filter operations on a filter overlap region specified in the third metadata for the at least two different filter operations to generate the foveated image frame, the filter overlap region to include a portion of the first image data and a portion of the up-sampled second image data, the filter overlap region corresponding to a rectangular strip with a width specified in the third metadata.

2. The head-mounted display system of claim 1, wherein the display controller is to render the foveated image frame on the display.

3. The head-mounted display system of claim 1, wherein the first metadata is to specify at least one of the second resolution of the second image data or a down-sizing ratio corresponding to the second resolution, and the second metadata is to specify a position of the first image data in the foveated image frame.

4. The head-mounted display system of claim 1, wherein the first resolution of the first image data is to correspond to a resolution of the display.

5. The head-mounted display system of claim 1, wherein the third metadata is to specify the width of the rectangular strip in pixels.

6. The head-mounted display system of claim 1, wherein the two different filter operations include at least two of a data smoothing, an averaging operation and a blurring operation.

7. The head-mounted display system of claim 1, further including a data interface to communicatively couple the host device and the display controller, and the display controller is to obtain the first image data and the second image data from the host device via the data interface.

8. At least one non-transitory computer readable medium comprising computer readable instructions that, when executed, cause at least one or more processors to at least:
obtain first image data and second image data for a foveated image frame to be displayed on a display, the first image data to have a first resolution and the second image data to have a second resolution lower than the first resolution;
up-sample the second image data based on first metadata to generate up-sampled second image data, the up-sampled second image data to have the first resolution;

combine the first image data and the up-sampled second image data based on second metadata; and perform, based on third metadata, a combination of at least two different filter operations on a filter overlap region to generate the foveated image frame, the filter overlap region for the at least two different filter operations to be specified in the third metadata, the filter overlap region to include a portion of the first image data and a portion of the up-sampled second image data, the filter overlap region corresponding to a rectangular strip with a width specified in the third metadata.

9. The at least one non-transitory computer readable medium of claim 8, wherein the instructions cause the one or more processors to render the foveated image frame on the display.

10. The at least one non-transitory computer readable medium of claim 8, wherein the first metadata is to specify at least one of the second resolution of the second image data or a down-sizing ratio corresponding to the second resolution, and the second metadata is to specify a position of the first image data in the foveated image frame.

11. The at least one non-transitory computer readable medium of claim 8, wherein the first resolution of the first image data is to correspond to a resolution of the display.

12. The at least one non-transitory computer readable medium of claim 8, wherein the third metadata is to specify the width of the rectangular strip data in pixels.

13. The at least one non-transitory computer readable medium of claim 8, wherein the two different filter operations include at least two of a data smoothing, an averaging operation and a blurring operation.

14. The at least one non-transitory computer readable medium of claim 8, wherein the instructions cause the one or more processors to obtain the first metadata and the second metadata from a metadata packet before the one or more processors obtain the first image data and the second image data.

15. A method comprising:
providing, with a first device, first image data and second image data for a foveated image frame to be displayed on a display, the first image data to have a first resolution and the second image data to have a second resolution lower than the first resolution;

up-sampling, with a second device, the second image data based on first metadata to generate up-sampled second image data, the up-sampled second image data to have the first resolution;

combining, with the second device, the first image data and the up-sampled second image data based on second metadata; and performing, with the second device and based on third metadata, a combination of at least two different filter operations on a filter overlap region to generate the foveated image frame, the filter overlap region for the at least two different filter operations specified in the third metadata, the filter overlap region including a portion of the first image data and a portion of the up-sampled second image data, the filter overlap region corresponding to a rectangular strip with a width specified in the third metadata.

16. The method of claim 15, further including rendering the foveated image frame on the display, wherein the first resolution of the first image data is to correspond to a resolution of the display.

17. The method of claim 15, wherein the first metadata is to specify at least one of the second resolution of the second image data or a down-sizing ratio corresponding to the second resolution, and the second metadata is to specify a position of the first image data in the foveated image frame.

18. The method of claim 15, wherein the third metadata is to specify the width of the rectangular strip in pixels.

19. The method of claim 15, wherein the two different filter operations include at least two of a data smoothing, an averaging operation and a blurring operation.

20. The method of claim 15, further including obtaining, at the second device, the first metadata, the second metadata and the third metadata from the first device.

* * * * *